(12) United States Patent
Parker

(10) Patent No.: US 10,310,152 B2
(45) Date of Patent: Jun. 4, 2019

(54) OPTICAL EFFECT STRUCTURES

(71) Applicant: Andrew Richard Parker, Richmond Greater London (GB)

(72) Inventor: Andrew Richard Parker, Richmond Greater London (GB)

(*) Notice: Subject to any disclaimer, the term of this patent is extended or adjusted under 35 U.S.C. 154(b) by 0 days.

(21) Appl. No.: 15/562,907

(22) PCT Filed: Mar. 31, 2016

(86) PCT No.: PCT/GB2016/050921
§ 371 (c)(1),
(2) Date: Sep. 29, 2017

(87) PCT Pub. No.: WO2016/156863
PCT Pub. Date: Oct. 6, 2016

(65) Prior Publication Data
US 2018/0284330 A1 Oct. 4, 2018

(30) Foreign Application Priority Data

Mar. 31, 2015 (GB) .................. 1505610.4
Sep. 29, 2015 (GB) .................. 1517196.0
Oct. 21, 2015 (GB) .................. 1518673.7

(51) Int. Cl.
| | |
|---|---|
| *G02B 1/10* | (2015.01) |
| *G02B 5/28* | (2006.01) |
| *G02B 5/02* | (2006.01) |
| *G02B 5/08* | (2006.01) |
| *G02B 5/26* | (2006.01) |
| *G02B 1/14* | (2015.01) |

(Continued)

(52) U.S. Cl.
CPC .......... *G02B 5/286* (2013.01); *B29D 11/0074* (2013.01); *B29D 11/00894* (2013.01);
(Continued)

(58) Field of Classification Search
CPC ........ G02B 1/04; G02B 1/061; G02B 1/0221; G02B 1/0226; G02B 1/0284;
(Continued)

(56) References Cited

U.S. PATENT DOCUMENTS

| | | |
|---|---|---|
| 3,338,730 A | 8/1967 | Slade et al. |
| 3,870,661 A | 3/1975 | Crook et al. |

(Continued)

FOREIGN PATENT DOCUMENTS

| | | |
|---|---|---|
| CN | 1363075 A | 8/2002 |
| CN | 1989429 A | 6/2007 |

(Continued)

OTHER PUBLICATIONS

Mutitu et al., "Hybrid Dielectric-Metallic Back Reflector for Amorphous Silicon Solar Cells", Energies, 2010, vol. 3, pp. 1914-1933.
(Continued)

*Primary Examiner* — Mustak Choudhury
(74) *Attorney, Agent, or Firm* — Bacon & Thomas, PLLC

(57) ABSTRACT

An optical coating structure is provided that when applied to a surface of an object to imparts a color to the object, the optical coating structure comprising: a base layer; a reflector on the base layer; and profile elements on the base layer under the reflector, the profile elements having a width and length which are each in the range of 5 to 500 μm in size, and being arranged in non-periodic manner or a periodic manner. The reflector may be a multilayer structure of alternating dielectric materials. A method of forming the optical coating structure is also provided.

19 Claims, 19 Drawing Sheets

(51) Int. Cl.
 *B29D 11/00* (2006.01)
 *B05D 5/06* (2006.01)
(52) U.S. Cl.
 CPC ............ *G02B 1/14* (2015.01); *G02B 5/0226* (2013.01); *G02B 5/0294* (2013.01); *G02B 5/0816* (2013.01); *G02B 5/26* (2013.01); *B05D 5/06* (2013.01)
(58) Field of Classification Search
 CPC ...... G02B 1/0833; G02B 1/0242; G02B 1/14; G02B 1/16; G02B 1/26; G02B 1/285; G02B 5/045; G02B 5/0268; G02B 5/0231; G02B 5/0221; G02B 5/0257; G02B 5/0841; G02B 5/18; G02B 5/26; G02B 5/28; G02B 5/282; G02B 5/286; G02B 5/287; G02B 5/305; G02B 5/1809; G02B 5/1842; G02B 5/1847; G02B 5/3008; G02B 5/3041; G02B 5/3083; G03H 1/0011; G03H 1/0244; G03H 1/0891; G03H 1/30; G03H 1/265; G03H 1/268; G03H 1/2286; G03C 1/7614; G03C 1/805; G03C 1/76; G03C 1/79; G03C 1/795; G09F 13/16; G09F 19/20; G07D 7/0032; G07D 7/121; B42D 25/324; B42D 25/328; B29D 11/0074; B29D 11/00894; B05D 5/065; B05D 5/067
 USPC ..... 359/1, 2, 9, 23, 25, 352, 487.02, 487.05, 359/489.15, 490.02, 493.01, 558, 359/566–569, 572, 582–589, 599, 883, 359/900; 427/162, 164, 250, 251; 428/30, 141, 142, 156, 163, 336, 337
 See application file for complete search history.

(56) References Cited

U.S. PATENT DOCUMENTS

| | | | | |
|---|---|---|---|---|
| 6,057,961 | A * | 5/2000 | Allen | G02B 5/3008 359/489.11 |
| 2004/0027517 | A1 | 2/2004 | Chol et al. | |
| 2015/0035269 | A1* | 2/2015 | Hooper | G07D 7/12 283/85 |

FOREIGN PATENT DOCUMENTS

| | | |
|---|---|---|
| CN | 103038676 A | 4/2013 |
| CN | 204059072 U | 12/2014 |
| EP | 1181673 A1 | 2/2002 |
| EP | 1923229 A1 | 5/2008 |
| EP | 1992479 A1 | 11/2008 |
| JP | S60248353 A | 12/1985 |
| JP | 2004151406 A | 5/2004 |
| JP | 2004177807 A | 6/2004 |
| JP | 2005153192 A | 6/2005 |
| JP | 2012247537 A | 12/2012 |
| JP | 2014102356 A | 6/2014 |
| JP | 90/02964 A1 | 12/2014 |
| JP | 2014240892 A | 12/2014 |
| WO | 00/72275 A1 | 11/2000 |
| WO | 01/03945 A1 | 1/2001 |
| WO | 2006/002552 A1 | 1/2006 |
| WO | 2006/007742 A1 | 1/2006 |
| WO | 2007131375 A1 | 11/2007 |
| WO | 2011/161482 A1 | 12/2011 |
| WO | 2013/124607 A1 | 8/2013 |

OTHER PUBLICATIONS

International Search Report in corresponding International Application No. PCT/GB2016/050921, dated Oct. 18, 2016.
International Preliminary Report on Patentability in corresponding International Application No. PCT/GB2016/050921, dated Jul. 25, 2017.
Intellectual Property Office letter to Mr. Andrew Richard Parker in corresponding Application No. GB1505610.4, dated Nov. 19, 2015.
Intellectual Property Office letter to Mr. Andrew Richard Parker in corresponding Application No. GB1609140.7, dated Aug. 17, 2016.
United Kingdom Examination Report in related GB Application No. 1609140.7 dated Oct. 8, 2018.
GB Office Action in related GB Application No. 1609140.7, dated Jun. 27, 2018.

* cited by examiner

Above

Side View

Smooth Surface    Rough Surface

Black, Opaque Substrate

Black, Opaque Substrate

20μm  Mag = 536 X   EHT = 20.00kV   Signal A = BSD   Chamber = 22Pa
⊢―⊣   WD = 24mm    Spot Size = 550  File Name = ARU43010.tif 20μm  Mag = 478 X   EHT = 20.00kV   Signal A = BSD   Chamber = 22Pa
⊢―⊣   WD = 27mm    Spot Size = 550  File Name = PSSS130012.tif 20μm  Mag = 595 X   EHT = 20.00kV   Signal A = BSD   Chamber = 22Pa
⊢⊣    WD = 26mm    Spot Size = 550  File Name = PSSS33014.tif

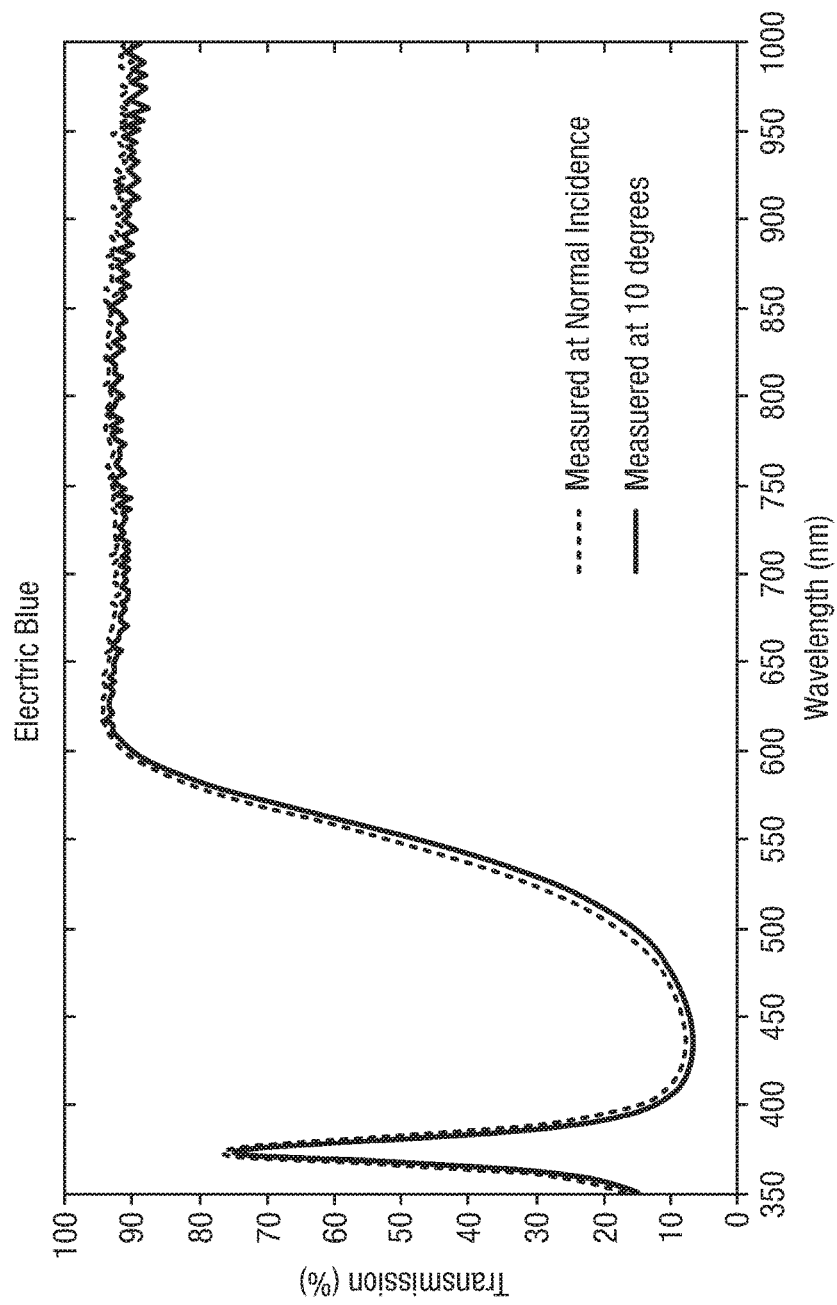

20μm  Mag = 483 X    EHT = 20.00kV    Signal A = BSD    Chamber = 22Pa
       WD = 24mm     Spot Size = 550   File Name = ARU423008.tif 20μm  Mag = 483 X    EHT = 20.00kV    Signal A = BSD    Chamber = 22Pa
       WD = 24mm     Spot Size = 550   File Name = ARU53011.tif 20μm  Mag = 589 X   EHT = 20.00kV   Signal A = BSD   Chamber = 22Pa
⊢⊣    WD = 25mm    Spot Size = 550  File Name = Original2A3017.tif 20μm  Mag = 487 X   EHT = 20.00kV   Signal A = BSD   Chamber = 22Pa
⊢⊣    WD = 26mm    Spot Size = 550  File Name = Original33015.tif

| 20μm | Mag = 568 X | EHT = 20.00kV | Signal A = BSD | Chamber = 21Pa |
|---|---|---|---|---|
| | WD = 17mm | Spot Size = 500 | File Name = ScratchTest2B18588.tif | |

| 20μm | Mag = 568 X | EHT = 20.00kV | Signal A = BSD | Chamber = 21Pa |
|---|---|---|---|---|
| | WD = 17mm | Spot Size = 500 | File Name = ScratchTest1A18684.tif | |

OPTICAL EFFECT STRUCTURES

FIELD

The invention relates to optical effect structures, in particular to an optical coating structure for imparting a desired color to an object when applied onto its surface.

BACKGROUND

An optical coating structure is a stack of one or more thin layers of material deposited on a substrate or object in a way that alters the way in which the object reflects and transmits light. The thin layers are deposited typically to a thickness of between 10 nm to 200 nm.

For example, a quarter-wave stack reflector is a well-known building block of optical thin-film products. Such a stack generally comprises alternating layers of two or more dielectric materials with different refractive indexes, in which each layer has an optical thickness (i.e., the geometric thickness of the layer multiplied by the refractive index of the layer material) that corresponds to one-quarter of the principal wavelength of reflection. Here, the wavelength of light reflected varies with angles of incidence and reflection, thus one can observe different colors at different viewing angles; a visual effect known as iridescence.

In this manner, an optical coating structure can be constructed to accurately and selectively reflect certain wavelengths of visible light in order to impart a desired color to an object at particular angles of incidence. Unlike paints in which the color is determined by pigments or dyes that are held together with binders, with optical coating structures the transition from near total reflection to maximum transmission can take place over a very short wavelength range, enabling a precise discrimination between different wavelengths. As a result, objects coated with such structures can take on a sharp and well-defined color, albeit each color is observable over a narrow range of directions only.

It is known from JP-A-2005/153192 to provide an optical coating structure comprising a base structure that has been etched to provide a surface with a large number of small (less than 500 nm) crevices with sides that extend normal to the surface of the structure. On top of the base structure is a coating made up of two polymeric layers alternately deposited on the substrate, one of the polymeric layers having a high refractive index and the other having a low refractive index. The layers are deposited so that they imitate the uppermost surface of the base structure and as a result, each layer, including the uppermost layer of the structure, has the same profile of crevices with sides that extend normal to the surface of the structure.

The structure disclosed in JP-A-2005/153192 provides a chromogen in which the color changes with the viewing angle and provides a gentle wavelength dispersion, a deep hue and a high reflectivity. The visual effects produced by this device are, at least in part, caused by diffraction effects caused by the crevices formed in the top layer and other layers of the device.

EP 1923229 describes a security device which has an arrangement of optical elements which each comprises a stack of curved alternating layers of different refractive indices. This security device changes its appearance depending on the the type of incident illumination and provides the appearance of a single dull color over its surface when viewed under diffuse light, giving the appearance of plastic.

WO 2011/161482 discloses an optical effect structure which comprises a multilayer reflector deposited on scattering structures which are sub-micron in size. This optical effect structure provides a bright color effect with minimal iridescence.

However, it remains desirable to provide an optical coating structure capable of providing a color that is sufficiently bright and that exhibits a minimal or limited iridescence effect, i.e., so that the color remains substantially the same to an observer over a broad range of viewing angles, whilst being relatively easy, cheap and/or reliable to produce.

SUMMARY

According to a first aspect, the present invention provides an optical coating structure that when applied to a surface of an object imparts a color to the object, the optical coating structure comprising: a base layer; a reflector on the base layer; and profile elements on the base layer under the reflector, the profile elements having a width and length which are each in the range of 5 to 500 µm in size, and being arranged in non-periodic manner or a periodic manner.

According to a second aspect the present invention provides a method of forming an optical coating structure, the method comprising: providing a base layer, the base layer having profile elements thereon, the profile elements having a width and length which are each in the range of 5 to 500 µm in size, and being arranged in a non-periodic manner or a periodic manner; and depositing a reflector on the base layer.

The reflector may be a narrow band reflector. Such a reflector may produce reflections over a limited wavelength ranges (e.g. 50 nm or less). The reflector is, however, distorted by the underlying relief provided by the profile elements.

It has been surprisingly realised that it is possible to have an optical coating structure which provides a color that is sufficiently bright and that exhibits a minimal or limited perceived iridescence effect without requiring the profile elements to be sub-micron in size. The optical coating structure has a metallic, almost anodised appearance.

WO 2011/161482 discloses an optical effect structure in which semi-circular (in cross section) submicron base structures are present. These base structures cause the multilayer reflector (i.e. stack) deposited thereon to conform to their profile as concentric circles. The size of the base structures are designed so that the very top (outer) layer of the multilayer reflector would form the shape of near-juxtaposed semicircles in cross-section. In other words, there would be a decreasing amount of flat area in each layer of the multi-layer reflector at an increasing distance from the base layer including the profile elements. Consequently, as a series of semicircular bumps, incident light would always strike the stack at the normal, regardless of (or at least over a very large) angle of incidence. If the base structures were a little larger, let alone an order of magnitude larger, then it would be one of the lower layers that would satisfy this condition, and the top layer would form a series of juxtaposed but shallow arcs that would not present the normal position from many angles of incidence. i.e. in the device of WO 2011/161482 it was thought that the arcs at the surface layer should be semicircles for the effect to be achieved.

It has surprisingly been found that a bright color can be provided with minimal perceived iridescence even when the profile elements are not sub-micron in size.

In the present case, the base structures, i.e., the profile elements, are not submicron and in fact are between 5 and 500 µm in size. In this case, the reflector has a near-identical profile to that of the profile elements. In the case of a multilayer reflector each layer may have substantially a near identical profile. This profile is the same as that of the base structures/substrate. This is because the base structures are significantly larger than the thickness of the layer(s) of the reflector. For example, the reflector may have a thickness less than 1 µm, or less than 200 nm.

It has been found that those parts of the reflector that are illuminated by incident light actually satisfy the normal condition. When the incident light is at 90 degrees to the whole structure, the tops of the peaks (and possibly the bottom of the troughs depending on the shape of the profile elements) will reflect, and these will present the normal condition. When light is at 45 degrees, only one side of the profile elements will be illuminated and reflect. However, the reflector will still satisfy the (roughly) normal condition. It has been found that although the sides are not quite flat, but roughly (and optionally sinusoidally) curved, due to global averaging by the eye of the observer (considering the size of each bump) this is averaged to a perceived single wavelength of reflection.

The optical effect structures may also, when in directional light, create a color with a slight sparkling effect. This is because the human eye may perceive reflections from individual profile elements which creates a 'sparkly' effect.

Thus, the optical effect structures can be considered as a two-part system utilizing nanotechnology to provide the thin films of the reflector and micro-technology to provide the optical elements of the optical coating structure. The manufacturing processes involve micro-structuring the base layer to create relief in the base layer before the thin films of the reflector are deposited.

The profile elements are shaped so as to result in a portion of the surface, for example greater than 25%, greater than 30%, greater than 40% or greater than 50% being approximately normal to the incoming light when the light is incident at the normal to the plane of the surface. The profile elements are also shaped so as to result in a portion of the surface, for example greater than 25%, greater than 30%, greater than 40% or greater than 50% being approximately normal to the incoming light when the light is incident at an angle of up to 45 degrees.

It has been found (as would be expected) that the change in wavelength of reflected light over viewing angle (i.e. iridescence) is greater than when the profile elements are submicron in size. However, it has been found that this increased iridescence is not sufficient to give a visual impression of iridescence to a human observer. This is because of how the reflected light is perceived by the observer. In other words, although when measured with a spectrometer there may be a shift in the wavelength of light reflected it has been found that this shift is too small to be detected by the human eye.

Also, it has been found that having greater than 25%, greater than 30%, greater than 40% or greater than 50% of the surface normal to the incoming light (even for angles up to about 45 degrees) is sufficient for just the color created by the reflections at the normal to be perceived, i.e. a single rich color is observed. It has been found that the submicron profile elements of the prior art will provide the desired bright color with minimal or no iridescence up to about 1 micron in size and that the larger profile elements, which are 5 to 500 µm in size (width and length), will provide the desired bright color with minimal or no perceived iridescence. However, with profile elements between about 1 and 5 microns the effect of iridescence is perceived by an observer.

Thus, when the submicron profile elements were increased in size it was found that at about 1 micron the limited iridescence effect started to disappear. It has since surprisingly been found however that with profile elements which are about 5 microns and larger the effect of limited or no perceived iridescence was again achieved. The optical coating structure of the present invention also has the advantage that it can be easier to manufacture than an optical coating structure which has sub-micron scattering structures.

Viewed from another broad aspect, the present invention can be seen to provide a method of imparting a structural color to an object by incorporating on a surface of the object an optical coating structure comprising: a base layer; a reflector on the base layer; and profile elements on the base layer under the reflector, the profile elements having a width and length which are each in the range of 5 to 500 µm in size, and being arranged in non-periodic manner or a periodic manner. The optical coating structure may be applied to more than 50% of a surface of the object, 60%, 70%, 80%, 90% of the surface of the object. It may be applied to substantially the whole of the outer surface of the object or to the entire outer surface of the object to impart a color to that object through the structure of the optical coating structure. The object may be hollow and the optical coating structure may be applied to an internal surface to impart a color to the inside of the object. The structural color may be in place of pigments that would otherwise be used to impart color to the object.

The present invention can also be seen to provide a structurally colored object that comprises an optical coating structure on a surface of that object, the optical coating structure comprising: a base layer; a reflector on the base layer; and profile elements on the base layer under the reflector, the profile elements having a width and length which are each in the range of 5 to 500 µm in size, and being arranged in non-periodic manner or a periodic manner.

Brief Description of Certain Optional Features

The following is a brief description of certain exemplary features which are optional to the present invention.

The profile elements are mainly between 5 and 500 µm in width and length. By this it is meant that the width and length of at least 60%, 75%, 80%, 90% or 99% of the profile elements (by area), for example, are between (and including the end values of the ranges) about 5 to 500 µm, 5 to 100 µm, 5 to 30 µm, 10 to 30 µm or about 10 µm.

One preferred range for the width and length dimensions of the profile elements is 10 to 50 µm, though commercial considerations may favour larger profile elements, e.g., extending up to 500 µm (particularly, but not exclusively, in case where the profile elements are in the form of recesses). This may account for 80%, 90%, 95% or 99% of the profile elements (by area).

The height of the profile elements may be between 0.1 and 50 µm, 1 to 5 µm, or 2 to 3 µm. At least 60%, 75%, 80%, 90% or 99% of the profile elements (by area), for example, have a height between (and including the end values of the ranges) about 0.1 and 50 µm, 1 to 5 µm, or 2 to 3 µm.

The height of a profile element may be the dimension of the profile element (in a direction perpendicular to the plane of the surface of the base layer) from the lowest point of an adjacent trough in the base layer on which the profile elements are located to the furthest most point of the profile elements from the plane of the surface. The length of a profile element may be the dimension of the profile element which is largest in a direction which is parallel to the plane of the substrate (i.e. base layer) and the width of the profile element may be the dimension which is parallel to the plane of the substrate and perpendicular to the length of the profile element. For example, in the case of a perfectly conical profile element the height would be the distance from the plane of the substrate to the peak/tip of the cone and the width and length would both be equal to the diameter of the cone at its base, i.e. at the plane of the surface. In the case of a concave indentation profile element, the height would be the distance from the bottom of the indentation to the top.

The combination of surface area to height measurements mentioned above helps to maintain the profile elements as low aspect ratio bumps or hollows. In this way a strong reflection may be maintained when viewing the optical effect structure within a cone of 90 degrees of the surface normal (for light incident normal to the structure) where little iridescence is observed. If the profile elements are made to a higher aspect ratio, then this may start to reduce the percentage "surface area" adding to the strong reflection since more of the profile element area will be made up of the lower regions of the profile elements which are not adding to the reflection. In addition, steeper curvature in the reflector will lead to more iridescence and the possibility of reflections becoming trapped by the profile elements.

Profile elements having a height of >5 µm may provide a good color effect, for example, when the same dimensional relationships (aspect ratios) are maintained for profile elements having larger surface area within the ranges described above (i.e., larger lengths, widths, diameters, etc.). Where the manufacturing process means that the profile elements can be made to a high level of precision, this will increase the strength of the reflection. As a result higher aspect profile elements manufactured to a high level of accuracy can produce the same strength of reflection as some optical coating structures having lower aspect profile elements. Moreover, any loss of the optical effect when higher profile elements are used may also not be that significant and may still produce an acceptable product. At least 60%, 75%, 80%, 90% or 99% of the profile elements (by area), for example, may preferably have a height of <50 µm, more preferably ≤25 µm and more preferably still ≤15 µm; most preferably these profile elements are of a height ≤10 µm. In some embodiments, at least 60%, 75%, 80%, 90% or 99% of the profile elements (by area), for example, have a height in the range of (and including the end values of the ranges) 1 to 10 µm, more preferably 2 to 10 µm.

The profile elements are introduced to the basal layer of the reflector (this is due to the profile elements being on the base layer to which the reflector is applied) to cause a degree of scattering in the reflector.

The base layer of the optical coating structure may be a surface of the object to which the optical coating structure is applied to impart color. The object may be any article onto which a desired color is to be imparted. For example, the optical coating structure can be applied to surfaces such as any product or device such as a plastic case for a communication device such as a mobile telephone, watches, computers, pens, household objects, coatings for vehicles, glass or crystal ornaments, glass, crystal, metal or polymer jewelry, or plastic objects, or to smaller surfaces such as flakes for cosmetics or paints. A product or device may be referred to as an object or vice versa. The optical coating structure may also be used in an art piece. It may be applied to ceramic articles, for example, in place of a glazing. It may be used to provide a color effect on an article of frosted glass or frosted plastic (e.g., an acrylic like Perspex, for example, a privacy screen or colored transparent wall, or it may be used to provide a color effect on a product comprising a defined region of frosting on a transparent glass/plastic surface, for example, cabinet doors, decorative screens, etc.

There is preferably no break in the continuity of the layer(s) of the reflector and the profile elements are configured to avoid diffraction effects.

The average period (this is the average distance between adjacent profile elements (e.g. peak to peak)) between adjacent profile structures may be between 5 and 100 µm, or about 25 µm. The desired average period may depend on the size and/or shape of the profile structures.

The surface of the object on which the profile elements are provided may be flat (i.e. planar) at the macro scale (i.e. over the order of millimeters). Alternatively, the surface may have a curvature. It has been found that the principle of reflection would break down at a ratio of the curvature of the substrate to the curvature of the profile elements of 1:5 or less. The ratio of the curvature of the substrate to the curvature of the profile elements may be about 1:50 or greater, or about 1:100 or greater. In some embodiments it may be desirable to form the profile elements on a flat substrate material and then bend the substrate into a more complex three dimensional shape, for example, a moulding process when manufacturing a housing for an object, such as a portable communication device having bent edges. During the bending operation, the profile elements may become distorted into strips. The dimensions of the distorted protrusions or recesses may still be within the ranges previously mentioned.

The multi-layer reflector may be applied to the substrate/profile elements prior to the bending operation or it may be applied subsequently. In both cases, a good color effect may still be achieved even for the bent/curved regions of the object.

The profile elements may comprise an upper, convexly curved surface. The curved surface may extend symmetrically either side of an uppermost point.

The profile elements may be protrusions from the surface of a substrate/base layer.

The profile elements may instead be indents (hollows) formed in the surface of a substrate/base layer.

While the profile elements are preferably smooth, curved shapes, they may include steps or flat sides to create the overall shape of the outwardly extending projection or inwardly extending indentation.

The profile elements may be protrusions or indents formed by roughening the surface of a substrate/base layer. In one example, the roughened surface is a roughened glass surface. In another it is a roughened plastic surface. Other materials, such as ceramics and metals may also make suitable substrate/base layer materials.

The profile elements can be any shape providing the width and length of (at least 60%, 75%, 80%, 90%, 95% or 99% of the profile elements (by area) of) the profile element is between 5 and 500 µm in size, 5 to 100 µm in size, 5 to 30 µm in size, 10 to 30 µm or about 10 µm. Profile elements in the range of 10 to 50 µm are also desirable in some configurations.

For example, the profile elements (whether protrusions or indents) may be approximately conical or frusto-conical (i.e. the projections or indents may have horizontally or diagonally flattened tops). These profile elements may be roughly shaped (and the elements may vary in height, width and length between profile elements) or the elements may be neatly shaped and be all substantially the same shape and have approximately the same dimensions.

The profile elements (whether protrusions or indents) may have an approximately part-spherical surface, for example, a convex or concave surface respectively having a substantially even radius of curvature. The curvature of adjacent profile elements may be substantially the same or may be slightly different, for example, within 50%, more preferably within 25%. The approximately part-spherical surface, as well as including smooth curved surfaces, may also comprise small steps or terraces, when viewed in close-up detail, for example, which might be artefacts from the manufacturing process in a 3D etching or printing process.

The profile elements may be a series of overlapping bumps/protrusions.

The profile elements may be a series of abutting or juxtaposed hollows/indents.

The profile elements may be randomly shaped plates (e.g. tiles) which have raised ends which overlap an adjacent plate.

The profile elements may include a curved surface. The surface may be entirely curved and/or angled relative to the plane of the base layer (at the micron level).

The base structure may comprise flat portions. These flat portions may be on the profile elements themselves and/or on the surface of the base layer between the profile elements. These flat portions may have a width dimension which is at least 0.5 μm. If present, the flat portions may have a width and/or length which is between 0.5 μm and 10 μm. When such flat portions are present the optical coating may cause an increased sparkling effect. This is because there can be a strong mirror reflection from each flat plane. The flat portions may vary with respect to their position and orientation on a profile element.

The profile elements may have height and width dimensions which are within a factor of three ($0.33w \leq h \leq 3w$ where w is the width and h is the height of the profile element) and/or height and length dimensions which are within a factor of three ($0.33l \leq h \leq 3l$ where l is the length and h is the height of the profile element) and/or width and length dimensions which are approximately the same or within a factor of three ($w \leq 3l$), two, 1.5, 1.2. The width and length of the profile elements may be substantially the same. For example, the profile elements may have a substantially circular cross-section (in a plane parallel to the plane of the base layer).

The profile elements (for example at least 50%, 60%, 75% or 90% by area) may have a ratio of height and width or length dimensions between 1:2 and 1:100, or 1:5 and 1:50, or 1:5 and 1:10.

The protrusions on a base structure may have variable size or a range of different sizes.

The profile elements may be closely spaced or juxtaposed. For example, the maximum gap (i.e. flat base layer) between profile elements may be less than 25 μm, 10 μm, 5 μm, 1 μm, 0.5 μm or 0.1 μm. For example the profile elements may appear to be an array of overlapping bumps/protrusions. For example, the profile elements may be in a form that mimics the pattern made by a plurality of closely packed bubbles on the surface of a liquid. The profile elements may look like the tops of peaks which are closely spaced or have been 'pushed' together.

The profile elements may be closely spaced so that there are substantially no flat portions between the profile elements, i.e. the edges of each profile element may be in contact.

The edges of the profile elements may form an angle to the plane of the base layer which is less than 45 degrees, 30 degrees, 25 degrees or 20 degrees.

The profile elements are arranged in a random or pseudo-random manner. This may be referred to as a non-periodic manner. When the profile elements are non-periodic it is possible to prevent significant diffraction caused by the profile elements. In other words, there should be no obvious periodicity.

The profile elements may also be arranged more evenly, for example, hexagonal close-packed, where the size of the profile elements is sufficient to prevent the optical coating structure acting as a diffraction grating. Accordingly they may also be arranged in a periodic manner. However, random/pseudo-random arrangements of profile elements are generally preferred, partly from a manufacturing perspective (random structures can be produced easily using acid-etching processes) and also from avoiding diffraction effects.

In this specification, "pseudo-random" is considered as a random arrangement of several adjacent structures that might reveal some degree of order over a "larger" area, such as when examined using a Fourier analysis, so that there is some, but not exclusive, constructive interference of reflected light rays of the same wavelength from the larger area). Consequently, the profile elements serve only to broaden the angular range of the light of wavelength reflected at the surface normal from a reflector.

By arranging the profile elements in a pseudo-random scattering pattern, in the case of a structure with a multilayer reflector, the optical effect of the profile elements on the multilayer stack will be to reduce the stack's property of color change with changing angle, so that the object will take on a single color that is visible from a range of angles with little or no perceived iridescence. Such a color is generally brighter than most pigments while possessing a subtle and rich appearance that is not glossy but instead a mesmerizingly deep, luxurious matt effect suggesting the impression of solid metal. This color has the advantage that it would not fade over time when exposed to light as occurs with pigments.

If the profile elements are too ordered, particularly at the lower ends of the size ranges, they may cause some (undesirable) iridescence (significant color change with angle through diffraction).

At any given time, the eye detects only a narrow range of the potential angles of reflection from an object (unless extremely close to the object), and global averaging of wavelengths gathered at the retina occurs within that narrow range of detection. Therefore the profile elements described here provide the visual effect of a rich, single color observable over a range of angles (for instance up to 20°, more preferably up to 45°, either side of the surface normal), i.e. with minimal iridescent/color change effect but with an appearance slightly brighter than that of a pigment or dye. In directional light there may also be a slight sparkling effect which is caused because the eye can just about perceive the reflection from each individual profile elements.

At certain wavelengths in particular, it has been found that a change of wavelength of up to 30 nm is not perceived by the observer. Thus, whilst a small shift in wavelength may occur over viewing angle, this is not 'seen' by a human. For example, it has been found that the human eye does not distinguish different shades of blue well, but it does for green. For example, a difference of 25 nm in wavelength in the blue range would not be discernible, whereas a change of 5 nm in the green range and the hue of color may appear fairly different to an observer. This means that for certain wavelengths at least, a small amount of iridescence may occur but this would not necessarily be perceived by an observer.

The base layer and/or the profile elements may be formed by deposition of material such as via printing techniques, by etching (e.g. lithographic/photochemical techniques, or other known methods used on silicon chips which form a "negative" of the base structure by removing rather than adding material) or by stamping. The base layer may for example be fine sand-blasted or acid-etched to form the profile elements.

The profile elements may be formed by casting, printing, stamping and etching for example. The profile elements may be formed by casting the material of the base layer with the profile elements thereon in a mold which has a surface with indents or protrusions which form the profile elements. The mold surface may have been roughened such as by grit blasting to form indents and/or protrusions thereon which cause the profile elements to be formed when the base layer is cast in the mold. The mold may have been formed by forming it on a surface that had been prepared from bubbles blown into a material, for example, a foamed metal structure. This would allow a base structure with a cellular structure of overlapping bumps to be cast.

The mold may be a mold with an acid-etched surface (which can vary slightly). The mold may have an average surface roughness of 1 to 20 μm, 1 to 10 μm, 2 to 10 μm, >5 to 10 μm, 1 to 5 μm, or 2 to 3 μm.

For example the base layer with the profile elements thereon may be made using a Cell Cast method. In such a method first, a syrup of methyl methacrylate is made, which is poured between two plates, for example, one or both of acid-etched material (this may be glass which could for example be around 3×2 m) that form a cell. A gasket (such as a PVC gasket) is then placed around the edge of this cell to keep the 'syrup' in, and the whole cell is then placed in an oven to polymerize the material (so the liquid becomes a solid).

The profile elements may be formed by adding a UV lacquer and varying matting agents in the mix.

Thin sheets of cured polymer (for example, about 1 mm, 2 mm or 3 mm thick sheets) can be produced by pouring a liquid form of the polymers onto a mold (e.g., a glass mold) comprising an inverse of the base layer profile elements. There may be a boarder around the edge of the mold. The liquid may be allowed to cure, e.g., at room temperature or may be activated, e.g., by heat or radiation. The thickness of the finished sheet may be determined by the volume of liquid poured on to a fixed area of mold. The polymer might be polyurethane, PDMS or silicone, for example. In the example of polyurethane, the person may have a couple of minutes to pour the solution into the mold before it begins to harden; it may cure fully overnight. Once cured, it may be peeled from the mold without splitting or leaving any material in the mold. This may achieve a flawless surface with a plurality of profile elements formed thereon to provide the base structures for the reflector. The sheet may then be placed in a coating machine. A polymer sheet of around 1-2 mm thick, e.g., 1.5 mm polyurethane sheet, may provide a suitable material for footwear such as trainers and other articles (it may provide a form of synthetic leather).

Preferred embodiments of the present invention may comprise the method step of introducing liquid polymer into a mold, curing the polymer to form a sheet of cured polymer comprising a profile elements, and removing the sheet from the mold to provide a base layer of the optical coating structure. A reflector may then be deposited on the base layer.

In the case where the profile elements are indents or hollows, they may be formed using a substrate with a plurality of holes (apertured substrate), for example, a mesh. The apertured substrate, e.g., mesh, might have apertures of the order of 10-50 μm wide, though larger sizes in the range of 50-500 μm may allow other mesh or mesh-like materials to be available. The substrate can be dipped into, spread or otherwise coated with a liquid polymer that then dries and/or cures to form the base layer with the profile elements. The curing may take place on a surface or possibly under the assistance of gravity, suction or air pressure, etc., so that the polymer film is pulled into the shape of a hollow between the strands of the apertured substrate, e.g., mesh. The apertured substrate might be in the form of a fabric-like material where deposited strands cross one another, or it may be formed from a sheet of material having an array of slits cut into it that are expanded into holes or by other means such as additive manufacture. Woven fabrics or other types of cloth substrates with similar aperture sizes could also be used in the same way. Also substrates built up from deposited fibres (fibre mats) could be used, which would have a less uniform placement of apertures and more random aperture sizes.

Preferred embodiments of the present invention may comprise the method steps of providing an apertured substrate, for example, in the form of a mesh, coating the apertured substrate (e.g., by dipping) in liquid polymer, and curing the polymer to form a base layer of the optical coating structure.

The reflector may be a multilayer reflector which comprises layers of higher and lower refractive index materials.

The multilayer reflector may comprise two or more layers. For example, the multilayer reflector may comprise three to twenty layers. These layers may be alternate/alternating layers of higher and lower refractive index materials. The number of layers will determine the reflectivity of the optical coating structure. For example, twenty layers (i.e. ten pairs of layers) should achieve 100% reflectivity and three layers (if arranged high-low-high refractive index material for example) should result in about 60 to 70% reflectivity. The number of layers may be 2 to 15 layers, preferably 2 to 11 layers and more preferably 2 to 8 layers. Although in these cases the reflectivity would be less than 100%, it has been found that this reduced level of reflection may not be perceived or noticed by an observer.

It has been found that if the multi-layer reflector contains too many layers the effect of minimal or no perceived iridescence may start to be lost. This is because the uppermost layers could start to have a profile which does not closely match that of the profile structures. Also, the number of layers affects the profile of the reflection curve (increasing layers tend to make the reflection curve narrower and therefore more sensitive).

The multilayer reflector may be a layered quarter-wave stack comprising alternate layers of two different materials with different refractive indices (n) but each with the same optical thickness (actual or geometric thickness×n=1/4λ).

Alternatively, a chirped stack with dielectric layers of varying thickness may be used. As is well known, a chirped stack can be designed to reflect varying wavelengths of light between the layers. Chirped structures may for instance be preferred where the desired color is gold, silver or copper.

The multilayer reflector may be a metal-dielectric reflector. For example, the reflector may have a metal (e.g. aluminium) coating on the substrate/base layer including the profile elements and one or more dielectric layers (e.g. $SiO_2$ which is about 200-500 nm thick). Such a multilayer reflector can provide vivid color effects for fewer layers and better uniformity and less angle sensitivity.

Alternatively the reflector may be a liquid crystal (chiral/helical-type) reflector. In this case the wavelength of reflection would be equal to the distance of two twists in the helical structure multiplied by the refractive index. Such a reflector would provide a degree of circular or elliptical polarisation properties in the reflected light.

The solid liquid crystals may for example be replicated in titania. These can be nano-engineered for a wide range of resonant wavelengths. For example, the pitch may be as low as 60 nm for a circular Bragg resonance at 220 nm in a $Sc_2O_3$ film. All colors, in a stable, solid material, can be made using this method.

There are also many other ways of producing liquid crystals in solid, stable (e.g. at room temperature) form (novel liquid crystal materials based on the porphyrin ring structure, or nanocrystalline cellulose, for example).

An advantage of using liquid crystals as the multilayer reflector is that they may be tuneable, for example, through being responsive to physical stimuli, e.g., electrical potentials, temperatures, etc., to provide a "tuneable color". The optical properties of the liquid crystals may be adjustable by using transparent filaments within the liquid crystal.

When applied to an object, an optical coating structure comprising liquid crystals may provide tuneable color which is observable over a broader angle with less color change than with current tuneable liquid crystals.

Flat multilayers within the liquid crystal reflector may be caused to expand and contract to alter the color imparted by the optical coating structure. In this way it may be possible to adjust a peak reflection of the reflector, e.g., by causing a shift of a peak wavelength in the range of 350 to 800 nm to cause a change in observed color. This might be in response to physical stimuli such as temperature and applied electrical potentials causing a stress to be induced in one, two or three orthogonal directions of the optical coating structure. For example, the stress may be induced through one or more devices adjacent or below the optical coating structure, e.g., one or more devices having layers with different thermal coefficients to make them responsive to changes in temperature or one or more piezoelectric devices which can cause strains when electrical potentials are applied.

Preferred embodiments of the present invention may include the step of depositing a liquid crystal coating on the base layer when depositing the reflector. It may include the step of fabricating one or more devices adjacent or under the optical coating structure in order to adjust a peak reflection of the reflector. The device may comprise a multilayer structure or a piezoelectric material.

Such optical effect coatings with tuneable color may have use with many different objects, for example to create a camouflage effect on an object such as a military vehicle, craft or device, or could be used in place of high-end paint works on cars and other vehicles, e.g., for a luxury market.

When the reflector is a multi-layer reflector, the method of forming an optical coating structure may comprise depositing a first layer of a first reflector material on the base layer, depositing a first layer of a second reflector material on the first layer of the first reflector material, (then if more layers are present) depositing a second layer of the first reflector material on the first layer of the second reflector material and so on to form the multi-layer reflector.

Layers of additional materials may also be incorporated into the reflector. One or more layers of different material(s) may be applied to the uppermost layer of the reflector. For example, the method may include the step of depositing a covering (i.e. protective) layer of an optically inactive material onto the reflector. The method may also include a further step of adhering a cut crystal or a cut glass element to the covering layer.

Thus, in some embodiments the optical coating structure may comprise an additional coating (a covering layer) over the multilayer reflector, for example, a resin or other flowable product applied to the multilayer reflector, and then a further, harder layer of a transparent material, such as a layer of glass, a layer of transparent ceramic material or a layer of transparent plastics may be applied over the top. If a glass (or similar) layer is glued to the multilayer reflector of the optical coating structure using a covering layer of refractive index matched adhesive, then the angle of any light incident on the surface of the glass is drawn towards the normal by virtue of the refractive index of the coating. The steeper angle of incidence means that the color effect produced by the optical coating structure becomes stronger for larger angles of incidence and there is less detectable iridescence.

A glass microscope slide pressed on to a refractive index matched layer (or substantially matched layer) of adhesive, for example, produces an attractive effect because the microscope slides have a particularly flat, smooth (at the micron/sub-micron level) outer surface. The refractive index of the adhesive (i.e., the additional coating) should preferably contrast with the multilayer coating—if it substantially matches the first layer of the coating then it may make the first layer optically ineffective reducing the effectiveness of the multilayer coating.

On a smaller scale, a similar method of applying a (very thin) sheet of glass as a top layer on an additional coating (e.g., a settable acrylic) of the optical coating structure, could be used to produce material which is broken up into flakes and then embedded in a transparent medium to produce a color effect. In one example this might be a paint. In another it might be a gel coat or layer of lacquer.

It is also possible to dispense with the top layer of glass or similar material and instead rely on a hardened surface layer of the transparent coating material itself, e.g., in the case of a thermally or chemically hardened resin, which is able to fill the spaces either in the profile elements (recesses) or between the profile elements (protrusions) at the base of the additional coating and provide a smooth outer surface at its top, The covering layer may be provided so as to provide a flat surface (i.e. a surface without undulations corresponding to the profile of the profile elements). This flat surface may be parallel to the top surface of the base layer (ignoring the profile elements).

The covering layer may protect the reflector and prevent it from detaching from the base layer or becoming clogged with dirt or grease in the gaps between profile elements. Fingerprints can cause grease layers on the surface which appear, under the microscope, as tiny oil patches with interference colors, affecting the desirable luxurious matt effect of the coating. The coating may also prevent scratching of the optical effect structure.

Without the coating material, the structure would have a matt appearance; whereas with the coating material (given a smooth surface at the sub-micron level) the structure may have a gloss appearance. Whether the structure has a matt appearance or a gloss appearance after the coating is applied may depend on the coating material and the thickness of the coating layer. For example, a thin layer of silicon dioxide which confirms to the stack profile may maintain the matt appearance of the surface.

It is important that when a covering layer is applied to the coating that no air is trapped, for example in the dips/troughs which form between the curved parts of the uppermost layer, as this will affect the optical effect observed. These gaps should be filled with a material which has a refractive index which matches the uppermost layer or the covering layer.

The covering layer may be made of silicon dioxide. The covering layer could be up to around 1 or 2 µm thick, for example, a 1 µm coating of $SiO_2$.

In general, the specific dimensions of the layers in the optical coating layer will vary depending on the materials of the reflector and the desired color to be imparted. In the case of a multilayer reflector, each layer of material of the multilayer reflector may have an actual thickness of the order of 50 nm to 150 nm for producing colors in the visible range.

For example, each layer may be about 100 nm for a red color depending on the materials used. The optical thickness (thickness×refractive index) should equal to a quarter of the wavelength of the desired light reflected at the surface normal (i.e. that representing the desired color observed). As will be appreciated, by varying these dimensions, different colors can be produced. For example, by reducing the dimensions, lower wavelength colors (such as violet) can be produced.

The multilayer reflector may have materials and thicknesses to result in a certain wavelength of light being reflected. For example, the wavelength may be about 425 nm to 450 nm for "blue", about 545 nm for "green" and about 680 nm to 700 nm for "red". These values lie at the far end for each color because they are observed at the surface normal of a flat stack, but as the angle of viewing increases (towards glancing incidence) then wavelength reflected shifts to the near (left) part of the spectrum.

As an example, to produce a blue color, when the stack comprises zirconium dioxide which has a refractive index of about 2.17 and silicon dioxide which has a refractive index of about 1.46, the following multilayer reflector may be used:

1. ⅛ wave $ZrO_2$=31 nm
2. $SiO_2$ ¼ wave=93 nm
3. $ZrO_2$ ¼ wave=62 nm
4. $SiO_2$ ¼ wave=93 nm
5. $ZrO_2$ ¼ wave=62 nm
6. $SiO_2$ ¼ wave=93 nm
7. ⅛ wave $ZrO_2$=31 nm It has been found that such a seven layer multilayer reflector achieves around 90% reflectivity of a blue wavelength, which can produce a bright and vibrant color effect.

$TiO_2$ may also be used as a high index material layer.

Preferably the outer layer of a quarter wave stack is a high index material to provide a stronger reflection.

Different colors can be achieved by using a different number of layers and different thicknesses, for example, in a $TiO_2$ and $SiO_2$ stack. Seven layers in total have been found to provide good blues, violets and silvery or greenish blues. Different colors have also been achieved using nine layers in total, including a deep orange, a rusty red/orange and a pale yellow.

In general, if the two materials used for the layers have a lower contrast in refractive index, such as $Al_2O_3$ and $TiO_2$, then more layers are generally needed to achieve suitable levels of reflectivity, but some new colors may become possible, including emerald green. However, more layers equates to more time in the coating machine which means that the base layer can become hotter. Depending on the material of the base layer, in some cases this may lead to complications such as the release of air bubbles or melting. The time in the machine is dependent on the material; the deposition rate for $TiO_2$ is about 8 nm/minute, whereas that for $SiO_2$ and $Al_2O_3$ is about 13 nm/minute, at an RF power of 800 W.

Due to the effect of the profile elements on the wavelength of reflection (the sloping sides of the base structures cause reflection of a shorter wavelength—see below), the peak wavelength of reflection is shorter than that for a flat quarter wave stack. For example, a stack optimised at a peak reflection of 732 nm (i.e. infra-red) can provide an orange hue when coated on the profile elements.

The multilayer reflector may even comprise as few as three layers. For example, it has been found that three layers in a high-low-high index arrangement can produce the blues and violets mentioned above, but their reflection peaks are shallower and broader (they are less bright and reflect a greater portion of the spectrum, which is in turn averaged by the eye. In this case the higher refractive index material may be the outer layer. For example the multi-layer reflector may be a layer of $ZrO_2$ on the profile elements, then $SiO_2$ and then a final layer of $ZrO_2$. In this case the higher refractive index material (the zirconium dioxide) is the outer layer.

When the layers of a multilayer reflector are deposited on the base layer that incorporates the profile elements, the reflector layers will follow the shape of the cross section of the profile elements. This is because the thickness of the reflector layers is much smaller than the size of the profile elements.

The layers will reflect incident light into a range of directions, but averaging around 0 to 20 degrees from the normal. Therefore, also considering the global averaging of the eye, the colored appearance produced by the optical coating structure will be one of a single color, changing only slightly in hue with changing angle. Effectively, this will create a structural color that appears to be a substantially uniform color from all directions.

Due to the fact that the size (i.e. height, length and/or width) of the profile elements is significantly larger than the thickness of the reflector, the reflector will conform to and follow the surface profile of the structure substrate/base layer. For example, the height, width and/or length of (for example at least 50%, at least 60%, at least 75%, at least 90% by area of) the profile element may be at least 10 times (e.g. 10 to 100 times) larger than the thickness of the reflector.

In terms of materials, the base layer and/or the profile elements of the base layer may comprise a transparent or black-colored material (such as black Perspex). When the base layer is transparent it may be coated with a material which is opaque to at least visible light. This coating may be over the whole surface of the base layer including the profile elements or the coating may be on at least the back and sides of the base layer. This is to prevent light coming through the optical coating layer from the base layer. Having a black base layer or a base layer with a black or opaque coating/backing will prevent stray light entering the substrate from the sides or underside of the base layer and thus allow a more brilliant color to be produced by absorbing those wavelengths in incident light that are not desired for reflection.

It has been found that if a white or transparent substrate/base layer is used a pearly effect can be obtained. One particular application for the coating may be on frosted glass where the reflector produces a color effect on the glass. The glass may be a panel or it may provide a portion of the object. The coating may also be applied to ceramics, e.g., china to simulate a glaze, or to plastics, e.g., common plastics for housings and articles such as acrylics.

Although the cone of reflection (i.e. the maximum angle at which no iridescence is perceived) is narrower than for prior art structures which are submicron, when the structures are applied to a black substrate the iridescence fades with angle into black. This is a desirable visual effect which is suggestive of a luxurious surface.

The materials used in the layers of the multilayer reflector may be generally dielectric materials such as silicon dioxide, titanium dioxide, zinc oxide, zinc sulfide, magnesium fluoride, zirconium dioxide and tantalum pentoxide. For example, the multi-layer reflector may comprise alternating layers of a relatively (compared to the other material of the multilayer reflector) high refractive index layer such as zinc oxide and a relatively (compared to the other material of the multilayer reflector) low refractive index material such as silicon oxide.

The covering layer may comprise silicon dioxide or other various (optically transparent) glasses. The covering layer may be made of a chemical vapor deposited poly(p-xylylene) polymer (e.g. Parylene).

The various layer(s) of the reflector may be produced and applied onto the base layer using a number of fabrication steps well-known to those of ordinary skill in the art such as printing, ion beam deposition, physical vapour deposition, chemical vapour deposition, molecular beam epitaxy sputter coating, dip and spray coating or self-assembly methods.

During manufacture of the optical effect structure, after the base layer with the profile elements has been formed, if the reflector is not applied immediately, it may be covered with a temporary protective film. This film may be removed immediately prior to application of the reflector. This temporary protective coating can prevent damage to the profile elements. In particular it may prevent dirt or grease coming into contact with the profile elements which may be difficult to clean prior to applying the reflector.

As previously mentioned, at any given time the eye detects only a narrow range of the potential angles of reflection from an object, and global averaging of the wavelengths gathered at the retina occurs within that narrow range of detection. As known, the color of light observed at a particular angle will depend on the optical distance of each layer through which the light travels. When a multi-layer reflector is viewed normal to the underlying base layer the light will travel a distance through each layer which is equal to the thickness of each layer. As a result, due to interference effects and global averaging in the eye, the color of light observed normal to the coating will be the color of light which is determined by the geometrical thicknesses of the layers and the respective refractive indexes of the layers. In a normal quarter wavelength stack (i.e. with no underlying profile elements), when viewed from an angle, the light detected by the eye at that angle will have travelled slightly further through each layer (a distance greater than the thickness of each layer) and thus the optical thickness travelled by the light rays will be larger. Light with a longer wavelength will be observed from the broader viewing angles giving rise to iridescence.

However, the presence of the underlying profile elements causes the layers to vary in angle relative to the plane of the substrate/base layer (as they follow the profile of the profile elements). Consequently over a broader range of viewing angles, a significant proportion of the reflector layer surfaces producing the observed reflections will be orientated more to the observer in a way that also substantially maintains the intended thicknesses in the layers of the reflector, i.e. the normal position. As a result, the color observed by the eye over that broader range of angles is relatively constant.

BRIEF DESCRIPTION OF FIGURES

Certain preferred embodiments of the present invention will now be described in greater detail by way of example only and with reference to the accompanying drawings, in which:

FIG. 11 illustrates measured transmission curves for an "electric blue" optical coating structures sample;

DETAILED DESCRIPTION

The color effect produced by the present optical coating structure can be explained using a unique combination of nanophotonics and geometric optics. A thin film stack may be used to generate color (in white light/sunlight) while juxtaposed, shallow arcs, one or two orders of magnitude larger, can be used to form a base that causes many tiny reflections over the surface that do not present significantly different angles to the incident light over most angles of observation. The global averaging function of the eye reduces the effect of "variations" in wavelength giving the impression of deep, luxurious, single color.

The thin film stack can take the form of, for example, quarter-wave layers (usually several layers) or a metal plus dielectric (two-layer) arrangement, but the base layer and reflector layers are generally flat at the micron scale. The visual effect is that one ("peak") wavelength appears to dominate the reflection from white light at each angle the optical coating structure is viewed from—in essence the observer sees a strong color corresponding to that wavelength. The reflection appears as a bright beam, although a different wavelength can dominate as the angle of incidence/observation changes, for example, resulting in a bright spectrum with different colors seen from different directions at the steeper angles.

Figure 1A:
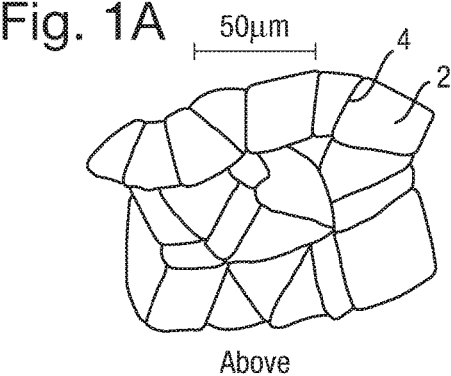
FIGS. 1A and 1B show a plan view and side view of an optical effect structure.
Figure 1B:

FIGS. 1A and 1B show an optical coating structure that when applied to a surface of an object imparts a color to the object. The optical effect structure has a base layer with profile elements 2 thereon. The profile elements 2 have a width and length which are each in the range of 5 to 100 µm in size, and are arranged in non-periodic manner (though they may also be arranged in a periodic manner). The heights of the profile elements 2 are in the range of about 1 to 10 µm (in some embodiments they may be in the range of 1 to 5 µm or >5 µm and 0 µm, for example, 2-10 µm). The profile elements 2 have valleys/troughs 4 between the raised profile elements 2 as shown for example in FIG. 1B.

A reflector is provided on the base layer. However, because the reflector is significantly thinner than the size of the profile elements 2 it is not shown in the Figures as it is not visible at this scale.

The reflector is a narrow band reflector. It may be a multilayer reflector which comprises alternating layers of higher and lower refractive index materials. It may comprise a quarter wave stack, where each layer is a quarter of the desired wavelength of reflection in "optical thickness" (actual thickness×refractive index). Preferably two materials are involved and are deposited alternately, e.g. $SiO_2$ as the low index layer, and $TiO_2$ or $ZrO_2$ as the high index layer. Seven layers in total (high, low, high, low, high, low, high) are sufficient to produce a bright and vibrant color effect for some colors, for example, up to 90% reflection may be achieved. Ideally, the outer layer should be the high index material, since this provides a stronger reflection. Note that for some stacks, the innermost and outermost layers may be ⅛$^{th}$ wavelength in optical thickness.

The thin films of the multilayer reflector can be deposited using dip-coating, vacuum coating, sputter coating, plasma coating, liquid-crystal chiral methods or block copolymer methods, etc., in a manner that is standard for optics manufacture (e.g. for filters). Plasma coating in particular is a high-level technique that provides particularly uniform coating partly through avoiding very high temperatures. Materials such as $ZrO_2$, $TiO_2$, $Al_2O_3$ and $SiO_2$ adhere well to many substrate materials, although some materials (such as polycarbonates) may require the addition of an "attachment" layer. The thin films can be deposited as a quarter wave stack to produce specific colors.

Another form of thin films may be a metal and dielectric coating (i.e. two layers only) approach. The thickness of the dielectric (outer) layer (e.g. $SiO_2$) will determine the wavelength reflected—it should be half a wavelength thick in optical thickness. Silver may be made by this method, and an attractive emerald green and crimson are also possible. Colors tend to be less bright and vibrant, and more subtle, and tend to change vary less with changing angle of viewing.

As shown, the profile elements 2 in the embodiment of FIG. 1A form a cellular structure of overlapping/juxtaposed protrusions with troughs 4 therebetween. By contrast, the profile elements 2 in the embodiments of FIG. 7D and FIG. 8B form a cellular structure of overlapping/juxtaposed hollows or indents with ridges 5.

Thus the substrate or base layer can have the form of micro-projections (positive), involving juxtaposed, shallowly curved bumps, or micro-indentations of the inverse (negative) shape, which form the base structures or profile elements. The profile elements may be evenly (e.g. hexagonally close-packed) or randomly shaped and vary in width/length/diameter from about 10-50 µm, and in height between about 1 and 10 µm. The profiles and dimensions need to be selected carefully since if the curves are too deep, the color effect will be lost (or might change to a different effect).

The role of the profile elements is to cause the thin films deposited on them to take on their profile throughout the stack. The shallow undulations in the thin-film stack have the effect of causing the same peak wavelength to be reflected over a broad range of angles of incidence/observation. When the effect of global averaging of the eye is taken into consideration as well (which negates the effect of "stray" reflections), causes the optical coating structure to appear as a single color from a wide range of directions, such as within a 90 degree cone centred at the surface normal. Beyond this range, the color will begin to change to colors corresponding to shorter wavelengths in the spectrum. For example, blue will eventually give way to violet. This may be considered a positive feature, since it signifies that something other than pigments are involved and creates the impression of a new optical effect. The optical coating structure appears particularly intense but not shiny—rather a mesmerizingly deep, luxuriously matt effect. When it is applied on a plastic substrate (i.e., the base layer is a plastics material), the optical coating structure can provide an appearance that suggests the presence of a solid metal.

The profile elements 2 vary in size and at least 80% (by area) of the profile elements 2 have a width and length which are each in the range of 5 to 100 µm in size and a height in the range of 1 to 5 µm.

Figure 2A:
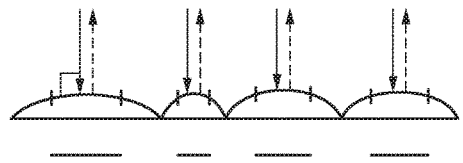
FIGS. 2A and 2B illustrate the approximately 'normal' portions of the optical effect structures.
Figure 2B:
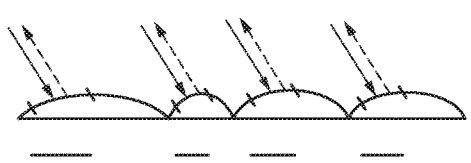

As shown in FIG. 2A when light is incident normal to the base structure about 50% of the surface (i.e. the reflector which matches the profile of the profile element) is approximately normal to the incoming light. As shown in FIG. 2B even when light is incident to the base structure at an angle (for example up to 30 degrees) a relatively large percentage (such as at least 40%) of the surface is approximately normal to the incoming light. As a result, the color which is perceived by a human can be the same even when the structure is viewed at an angle of up to 30 degrees from the normal.

Due to the way in which a human processes wavelengths of light, having at least 40% of the surface reflecting approximately the same wavelength will result in a single pure color being perceived by the observer.

When the narrow band coating is being viewed at a shallow angle to the normal (e.g. ±30 degrees) the optical thickness of the layers is larger leading to a shifted reflection. Due to the nature of the underlying profile elements some of the observed rays will always have a component of the shifted wavelengths, and as a result, it is necessary when designing or forming the optical effect structures to have to choose a modified wavelength (by altering the reflector) to reach the desired perceived wavelength.

Figure 3:
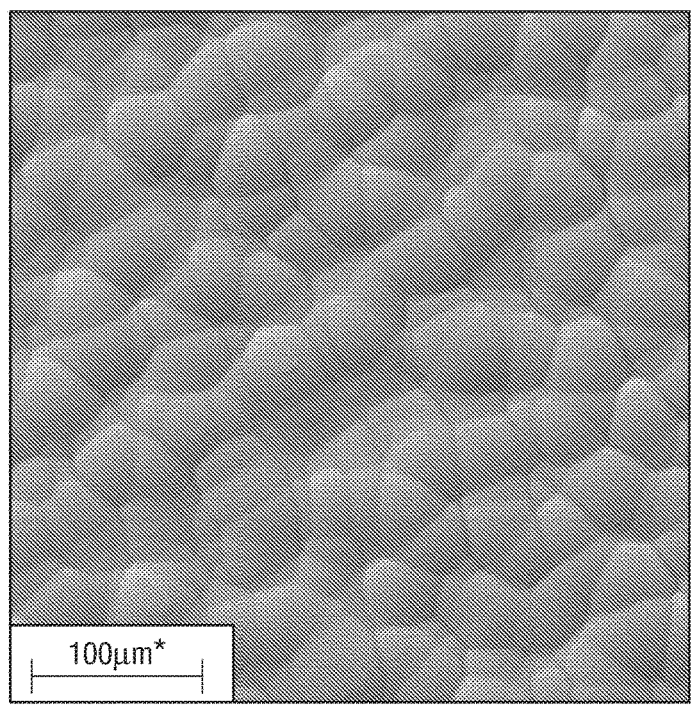
FIG. 3 shows an electron micrograph of the optical effect structure shown schematically in FIGS. 1 and 2.

FIG. 3 shows an optical electron micrograph taken of an optical effect structure. The magnification was 366×, the EHT was 20.00 kV, the signal is received from a backscattered detector (BSD), the pressure was 20 Pa, the working distance (WD) was 15 mm and the spot size was 510. This image clearly shows the cellular structure.

Figure 4:
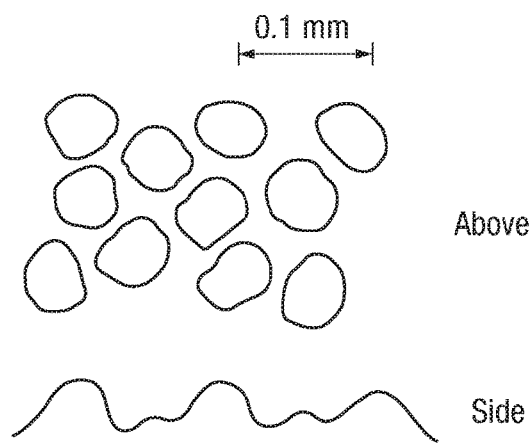
FIGS. 4, 5 and 6 show alternative optical effect structures.
Figure 5:
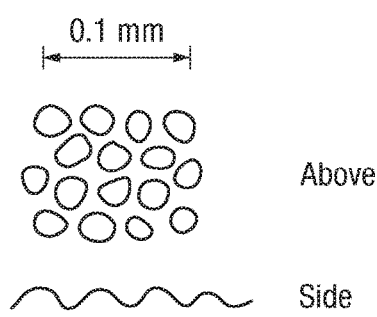
Figure 6:
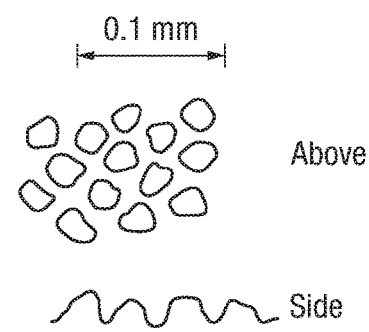

FIGS. 4, 5 and 6 show alternative embodiments. As shown in FIG. 4 the profile elements 2 may have varying heights. As shown in FIG. 5 the profile elements 2 may be equal sized elements. As shown in FIG. 6 the profile elements 2 may have flat portions which may be at varying angles to the normal. These flat portions may result in the optical effect structure having an increased 'sparkly' effect.

Figure 7A:
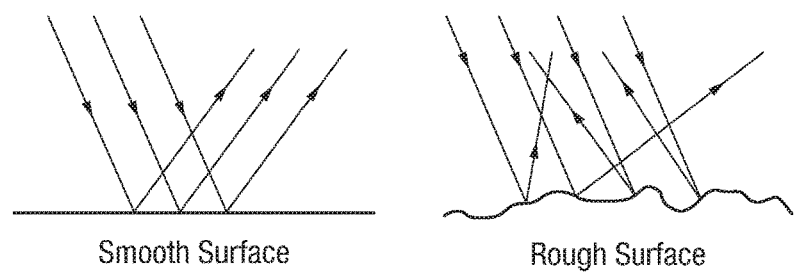
FIGS. 7A-7D illustrate schematically the operation of reflections with the optical coating structure.

FIG. 7A illustrates typical reflections of light rays from smooth and rough surfaces. The smooth surface provides mirror-type reflections; the rough surface provides random reflections.

Figure 7B:
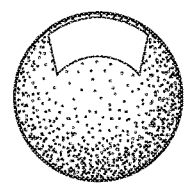

FIG. 7B illustrates how the reflection of a "point" light source is observed in a curved, smooth surface, in this case a sphere. The reflection is broadened by the curvature. If multiple sections of spheres are close packed, the global reflection could be made to cover over half of the entire surface.

Figure 7C:
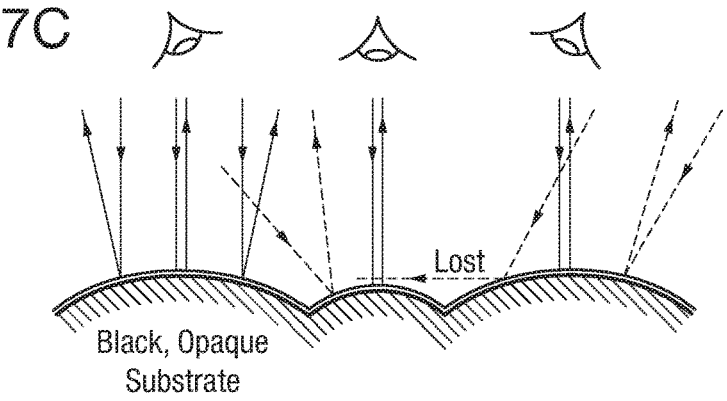
Figure 7D:
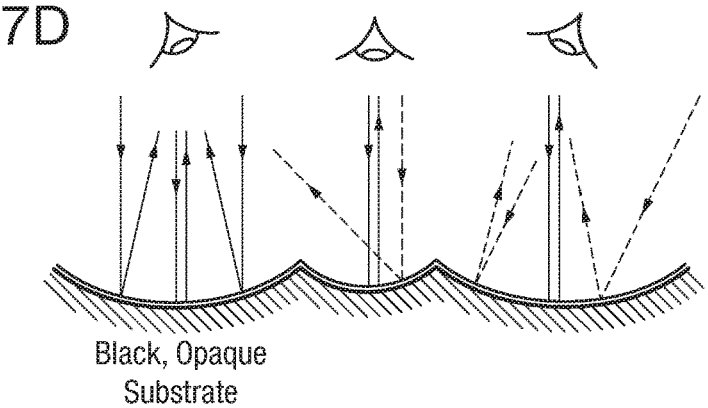

FIGS. 7C and 7D are schematic illustrations to indicate the scale of the thin-film layers compared with the two forms of base structures forming the profile elements (an example of micro-projections above in FIG. 7C and an example of micro-indentations below in FIG. 7D), in cross-section, and their effect on light incident from different directions. The reflections are broadly similar to those seen in FIG. 7B, but instead originate from multiple profile elements; similar to where multiple sections of spheres are close packed. The presence of a thin-film reflector causes a change in color. However, as the wavelength of a reflection from a thin-film reflector will vary with angle of incidence, it means that the thin-film reflector requires a shallower curvature than occurs in the example of the spheres in order to prevent a unidirectional light from receiving a wide range of angles of incidence. Thus the height of the profile elements is preferably 0 µm.

As with the example of the sphere in FIG. 7B, the optical coating structure can produce an effect where a large (for example, over 50%) proportion of the surface area appears illuminated to the eye at any moment, although in addition the reflection will appear colored.

To produce the brightest colors, the substrate should be black and opaque, in order to prevent back-reflection of any incident light not reflected by the thin films (back-reflection would dilute the reflected rays which have been selected for by the thin films).

Since the optical coating structure contains no pigments, it will never fade. It is also extremely thin, for example, just 150-500 nm in thickness (or a few microns if the base structures providing the profile elements are also considered, which could be "built in" to any product).

The optical coating structure is made by forming the base layer with the profile elements already present (for example, by moulding, stamping, printing, etc.), or by forming the profile elements on an already manufactured base layer (for example, by acid etching, stamping, printing, etc.). The multiple thin-films (or alternatively chiral, liquid crystal-type structures) are deposited on top.

The profile elements of the base layer are preferably made by acid etching, to produce a suitably sized and shaped, random topography. The surface of a product can be acid etched or (more commercially) the inner surface of a mould or die of a product can be acid etched. For example, glass can be acid-etched and this can be used to form some or all of a mould or die for a plastic material, for example, a thermoplastic material such as an acrylic sheet, to leave the inverse pattern on the surface of the finished acrylic product. The acid-etching technique is relatively cheap making it particularly attractive from a commercial point of view Alternatively, a lacquer coating process can be used. Any product can be coated in a suitable lacquer, for example, into which the mould/die can then be applied (for example, in a stamping process). As another option, the optical coating structure could take the form of self-adhesive thin sheets which are then attached to the surface of a product (this can be carried out on a reel-to-reel machine, using a PET or PMMA substrate for example). Alternatively, regularly-shaped base structures can be made in the form of a mould through Nano Imprint Lithography or by using some other three-dimensional printing methods. The profile elements also lie within the (size and shape) fidelity limits of "standard industrial" injection moulding and blow moulding, and vacuum forming processes. Accordingly, the profile elements could be reproduced on the internal surfaces of industrial moulds so that they become incorporated into the formed products. The formed products can then be coated. The acid etching technique can be used to form the master dies for such injection moulding, blow moulding or vacuum forming machinery.

In another embodiment, the hollows can be produced by dipping a very fine polymer mesh (e.g. a mesh with holes in the order of 50 µm wide) into a liquid polymer, then removing the mesh so that as the liquid polymer cures, it adopts a curve (dips) in the spaces between the strands. This may be through gravity and/or molecular forces. Molecular forces may assist by forming meniscuses (providing steeper side portions) where the polymer film attaches to the strands of the mesh and a flatter central region of the hollow where the meniscuses join in the centre of each aperture.

The mesh preferably has apertures of the order of 10-50 µm wide, though may have apertures anywhere in the range of 5-500 µm. The mesh may be formed as strands of material, e.g., strands of polymer, which cross each other, as an expanded mesh where slits are formed in a sheet, e.g., cut by a laser, and the sheet is then pulled to expand the apertures and form an expanded mesh, or by other means.

In place of a mesh, a woven fabric or cloth substrate can be used. The fabric or cloth can have apertures in the same ranges as above. Similarly a cloth-like material could be built up from deposited fibres with apertures in the same ranges. This would provide apertures with a more random distribution of sizes and spaces. In another embodiment a mesh substrate with a pseudo-random distribution of apertures within the size ranges mentioned above could be produced by additive manufacture. In another embodiment the mesh could be formed through removal of material e.g., by a laser cutting process, a photo-resist process, or an etching process to produce a pseudo-random distribution of apertures.

The mesh or apertured substrate can be dipped, spread, sprayed or otherwise coated with a liquid polymer to provide a film extending across the apertures. The liquid polymer can then be dried and/or cured to form the base layer structure for the reflector. A film of polymer may be offered up and adhered to the mesh or aperture substrate and the hollows induced as the polymer cures. Gravitational and molecular forces may be sufficient to create the hollows while the polymer cures. If desired, assistance may be provided through surface pressures, for example, through the pressure of air or a gas directed at the surface, the weight of a liquid or particles resting in the hollows as the material cures, or through reduced pressure below the hollows, to help induce curvature in the hollows.

The apertures in the substrate are bridged by the film to form the hollows or pits. The strands of the mesh may remain visible. Preferably the strands are covered to present just one material and aid coating with the reflector. The liquid polymer could form a thin layer just covering the back of the mesh or a thick layer, where the mesh is only visible at the surface. The mesh or apertured substrate may then be applied to the surface of an article to provide the base layer structure and the multilayer reflector applied to impart color to the article.

The mesh or apertured substrate material and/or the polymer material should preferably be dark or black to help intensify the colored reflection. However a transparent version may also provide utility in an optical coating structure. It may for example produce pearlescent effects once coated with a multilayer reflector.

The finished product could be formed as a thin, colored material with commercial applications such as a "synthetic leather" etc. The underlying mesh or aperture substrate may provide additional strength for a flexible material and may help to guard against stretching etc.

Examples of polymer materials suitable for the base layer structure include PDMS (polydimethylsiloxane), polyurethane and silicone. The mesh substrate may be made from the same polymer material. Example mesh thicknesses that have been shown to produce useful structures have been in the range of 0.5 to 1 mm, more particularly 0.8 mm. Sheets having a plurality of profile elements in the form of recesses can be generated easily by this technique, the sheets being preferably between 1 and 3 mm thick. These can be coated with a reflector to form the optical coating structure. The coated sheet can be useful in the production of footwear, bags, wallets, covers, vehicle upholstery, etc., where the optical color effect is used to create a desired color in place of pigments.

Figure 8A:
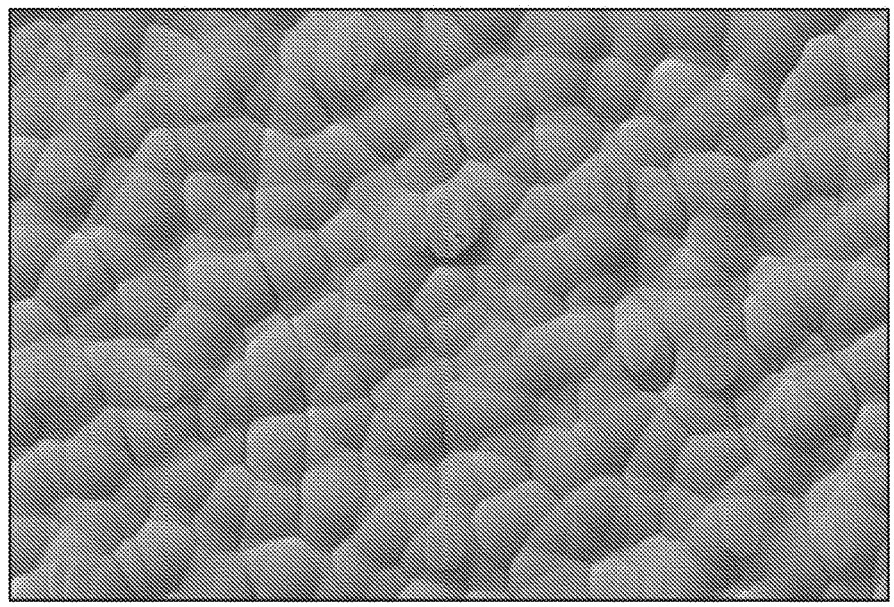
FIGS. 8A and 8B illustrate scanning electron micrographs of the two types of base structure, namely profile elements in the form of convexly curved projections and as concave indentations (one is the inverse of the other)
Figure 8B:
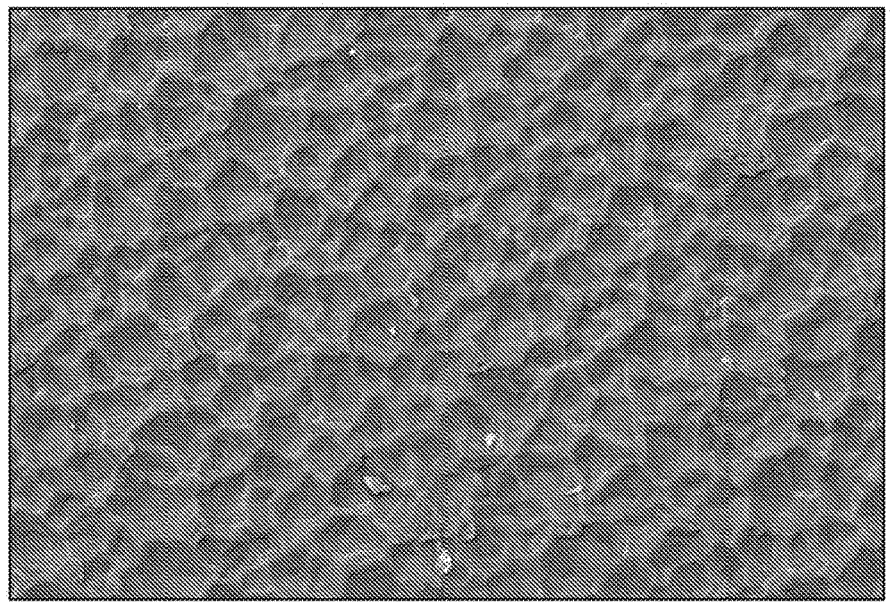

FIGS. 8A and 8B show scanning electron micrographs of the two main types of base structures for the optical coating structure. The micrograph of FIG. 8A is at a magnification of approximately ×536 and shows a plurality of convexly curved projections. In the image, it is possible to make out flattened tops to some of the projections. These are imperfections caused by inaccurate removal of the mould, and may add some "sparkle" to the optical effect created by the coating structure. FIG. 8B is at a magnification of approximately ×478 and shows a plurality of concave indentations which provide the profile elements for the optical coating structure. The base layer of FIG. 8B is essentially the inverse of the base layer of FIG. 8A.

Some forms of acid etching may cause the curved projection-type profile elements. Other forms, such as hydrofluoric acid ("HF") etching (e.g. using 7:1 or 20:1 buffered hydrofluoric acid), involve a "2D" etching process, and so several steps are required to build a 3D structure. Here, at each step the acid dissolves the substrate material to a shallow depth, leaving sloping sides and a flat base (i.e. inverted, trapezoid in cross section). Where a large flat base remains after acid etching, this will cause a mirror reflection and appear as a "sparkle" amidst the otherwise matt effect.

However, there are additional aspects to how the profile elements are formed via acid etching, which play greater or lesser roles depending on the precise etching method. Self-organization can lead to the formation of 3D islets at the 20 μm scale (the islets may comprise straight, sloping sides forming the macroscopic shapes of the indentations); additionally, elastically-deformation forces, and the action of defectively-deformative and capillary-fluctuation forces may also be considered. Certainly, it is known that self-organizing processes that lead to nanostructuring can occur spontaneously on surfaces under certain macroscopic conditions.

When comparing projection and indentation type profile elements used to create the base structures, both types of profile elements produce similar, attractive visual effects. There are some differences, however. The projection type profile elements, in general, cause a less sparkly effect (and, subjectively, a possibly less-bright appearance), but tend to cause a more pronounced change in hue with changing angle.

By way of example, the profile elements may have a height (or "surface roughness") of (usually) 2-5 μm (typically 5 μm). If they are moulded directly into a product, then this is their actual height; if a layer of lacquer is first applied then this adds an additional 2-5 μm (minimum) to the device (i.e. the lacquer with profile elements may be around 6 μm thick at its thickest point).

The layers of the reflector may be each around 870 nm in actual thickness. Therefore, two layers add 1640 nm (0.164 microns) on to the profile elements/lacquer base layers, while seven layers add around 500 nm (0.5 μm) on to the base layers.

Consequently, the "thickness" of the optical coating structure depends on how the base layers are produced and considered. If they are moulded directly into a product, then they could be considered to have a height of either zero or 2-5 μm (or half of this (i.e. mid-height)). Then the multilayer component will add an additional thickness of around 0.164 or 0.5 μm.

When considering manufacturing tolerance and which part of the manufacturing process could cause a change in visual appearance, the two components of the optical effect structure should be considered separately.

The profile elements, in terms of optical components, these structures are comparatively large, shallow, scalloped projections or indentations, preferably around 10-50 μm wide (preferably variable and randomly arranged, e.g. as shown in FIG. 8A or 8B). Due to such random variation in sizes, tolerance to manufacturing variation and imperfections is high. However, in the case of the projection-type, it is more important for the curvature to be even or substantially even. If flat regions occur (for example, as a result of a fault in the moulding process) then the degree of sparkle will increase, as a result of introducing tiny mirrors.

In practice, the indentation-type base structures, for example, made via several steps of HF etching, can appear as different colors when examined at 200× magnification. There are flat areas, such as at the base of each "pit" or "indent" and at the raised areas between pits (indents), or vice versa if the inverse structure is made via moulding. These appear as a different color of longer wavelength than the sloping regions (the sides of the pits/indents). For example, the flat regions can appear cyan while the sloping areas appear violet. To the unaided eye, these colors are combined and averaged to appear as a single hue (e.g. blue). However, if the flat regions are relatively large (e.g. more than 20 μm), they can be observed by the unaided eye and provide a mirror-type reflection, appearing as a "sparkle". A high frequency of these "defects" leads to a sparkly effect of the color device under directional light. This may or may not be desirable, depending on the specific color and application.

Figure 21:
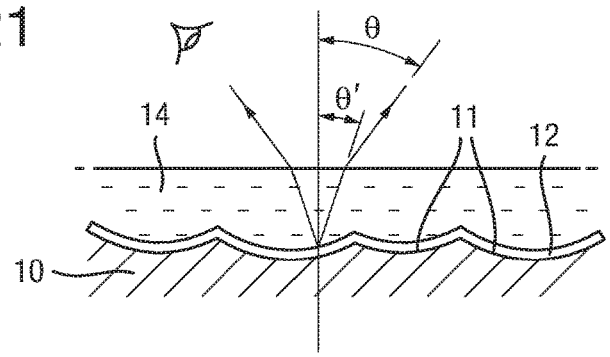
FIG. 21 illustrates schematically an optical coating structure comprising an additional coating layer.

FIG. 21 illustrates an optical coating structure comprising a base layer 10 provided with profile elements 11 in the form of a plurality recesses. Onto the surface of the profile elements 11 is deposited a multilayer reflector 12. The optical coating structure also comprises an additional coating 14 applied to the surface of the multilayer reflector 12. The additional coating 14 may comprise a thermally or chemically settable material, for example, a polymeric material such as a resin. It may, for example, comprise an acrylic material that can be set in situ.

With a suitable choice of refractive index, the transparent material can be selected to modify the angle of incident light rays as they approach the multilayer reflector 12, so that they are shifted closer to the normal as they descend through the material of the additional coating 14 (the angle of incidence may shift from θ to the θ' as shown in the FIG. 21). In this way, the color effect described above becomes more reliable, even at the larger angles of incidence or viewing, because of this shift towards the surface normal; it reduces the tendency to create iridescence at larger viewing angles.

Figure 22:
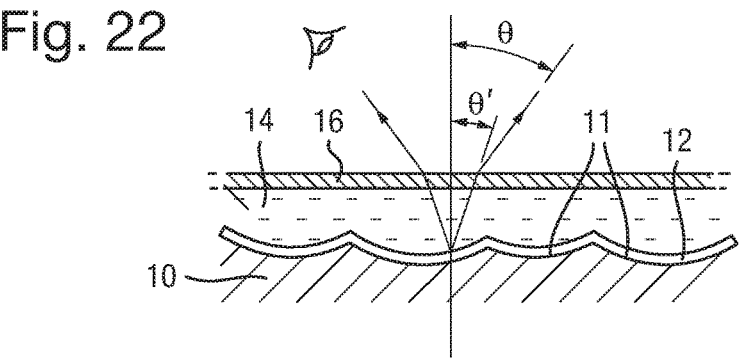
FIG. 22 illustrates schematically an optical coating structure comprising an additional coating and a top layer.

FIG. 22 illustrates a similar optical coating structure comprising a top layer 16 of a smooth, hard transparent material such as a glass sheet, which has been applied to the additional coating 14. Other materials with similar optical, refractive and mechanical properties to glass will also be suitable, for example, certain ceramics and plastics. The top layer 16 may itself comprise further coatings (not shown) such as anti-reflective, scratch resistant or colored coatings, as desired. Similarly, the additional coating 14 may comprise an initially flowable material that takes up the shape of the profile elements 11 and adheres the top layer 16 to the multilayer reflector 12. The additional coating 14 may be chemically or thermally cured. In addition, it is preferably refractive index matched to the top layer 16 so that the two layers 14, 16, optically, act as one. In the case of a glass top layer 16, the glass will provide scratch resistance to the optical coating structure.

Figure 23:
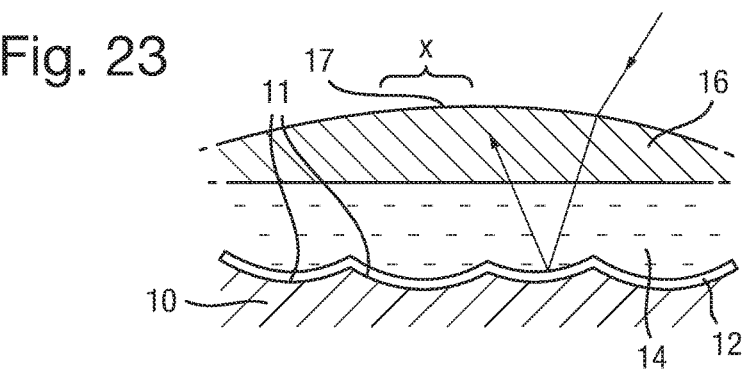
FIG. 23 is a schematic representation of an optical coating structure where a top layer comprises a cut crystal.

FIG. 23 illustrates a variation on the FIG. 22 embodiment where the planar top layer 16 has been substituted for a layer of cut crystal 16. Light enters the crystal at different angles through the different crystal facets 17 which might have a dimension x (the figure is schematic and not to scale—in practice, the facets 17 of the cut crystal 16 may be many magnitudes larger than the size of the profile elements 12 formed in the base layer 10). Again the underlying additional coating 14 should preferably be refractive index matched to the refractive index of the cut crystal 16. Slightly different hues may be seen in the different facets 17 of the cut crystal 16 by an observer.

Figure 24:
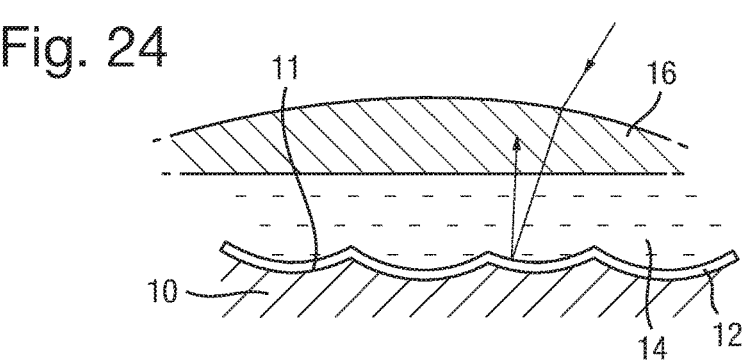
FIG. 24 is a schematic representation of an optical coating structure where a top layer comprises a convex shaped element.

FIG. 24 illustrates a further variant on FIG. 23 where the cut crystal top layer 16 has been substituted for a rounded element, for example, a convex-shaped piece of glass 16 (e.g., a dome shaped element) or other suitable transparent material.

While FIGS. 21 to 24 show profile elements 12 in the form of recesses, the profile elements 12 could also be formed as protrusions.

Figure 25:
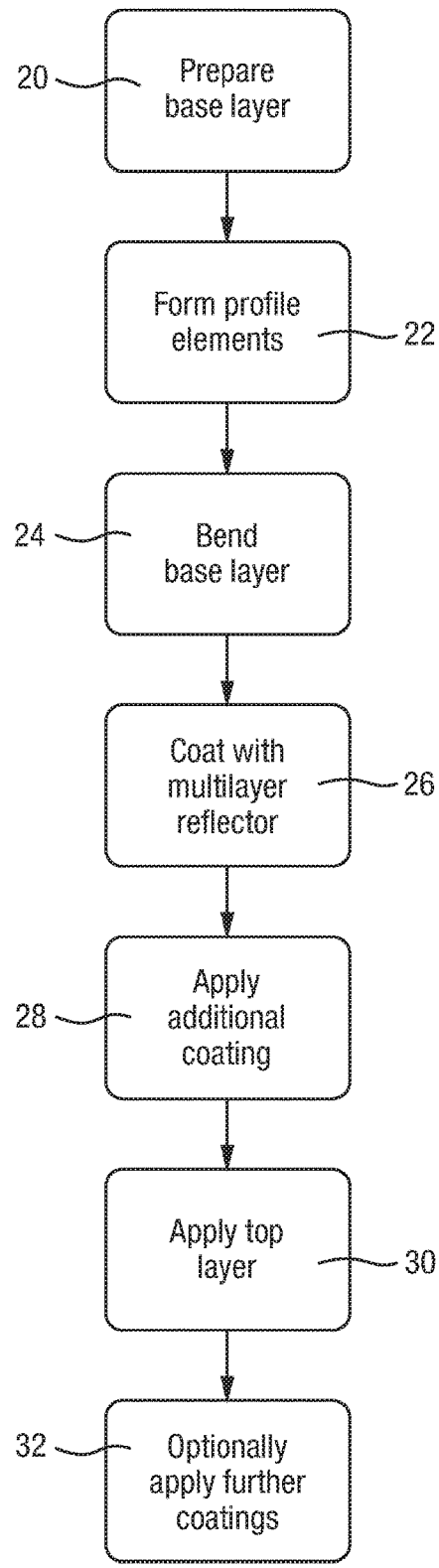
FIG. 25 is an exemplary flow diagram of a production process for a preferred optical coating structure.

FIG. 25 shows a flow diagram of possible process steps during the manufacture of the optical coating structure. At step 20, a base layer is prepared. This may comprise cutting a blank to a particular size and/or treating it for the subsequent steps. The base layer may be a planar expanse of material at this stage. Then the profile elements, which may be recesses or projections, are formed on or in the base layer at step 22. This may be through an etching, deposition, moulding, stamping, printing or other suitable process. While the base layer is flat, this may make the formation of the profile elements easier. At step 24, the base layer may then be bent to shape, for example, in a moulding operation to form an edge of a housing. The profile elements may then be coated at step 26 with a multilayer reflector if they are not already coated. The multilayer reflector may comprise a quarter wave plate reflector, for example, any of the above reflector structures. An additional coating, for example, a layer of curable polymeric material may then be applied to the multilayer reflector at step 28, and then a top layer applied to the additional coating at step 30. If desired, further coatings may be applied to the optical coating structure at step 32.

Figure 26:
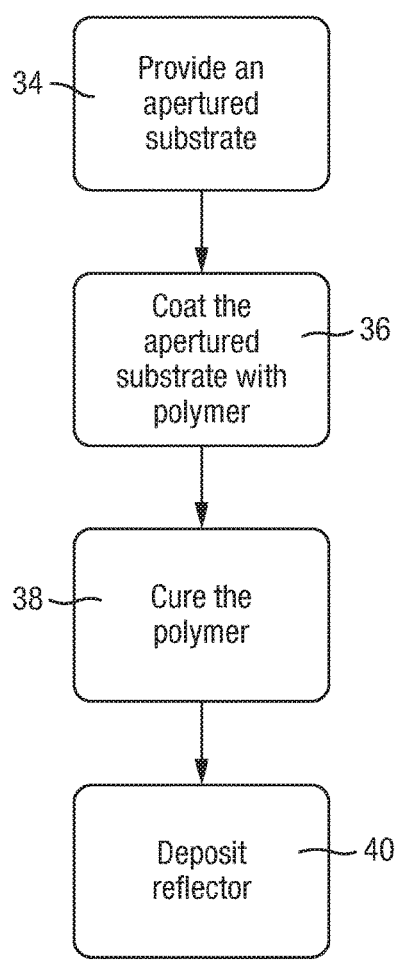
FIG. 26 is a flowchart illustrating steps for providing a base layer of an optical coating structure.

FIG. 26 is a flowchart illustrating steps for providing a base layer of the optical coating structure according to one embodiment. In step 34, an apertured substrate is provided. This may be in the form of a mesh. The apertured substrate is then coated with liquid polymer 36. In one example, a mesh is dipped into liquid polymer. The polymer is cured in step 38 to form the base layer. Once cured, the polymer sheet, which still comprises the apertured substrate, can be introduced into a coating apparatus and a reflector can be deposited on the base layer 40.

Figure 27A:
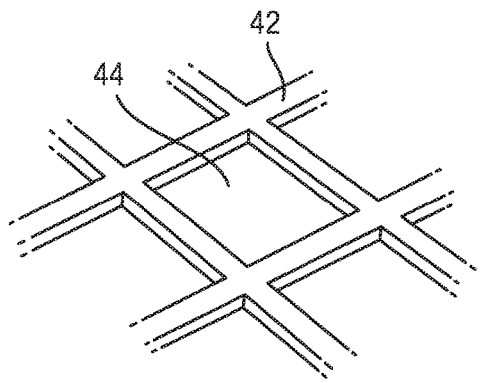
FIG. 27A is a schematic representation of an apertured substrate in the form of a mesh.
Figure 27B:
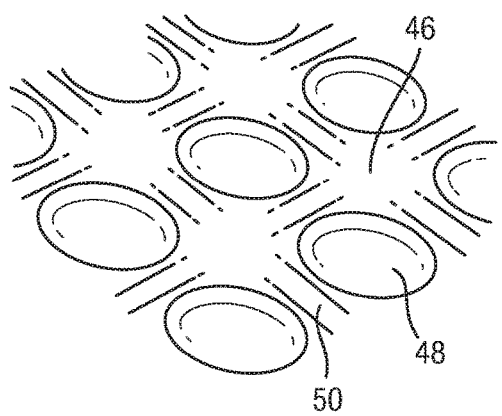
FIG. 27B is a schematic representation of an apertured substrate in the form of a mesh coated in a polymer.

FIG. 27A is a schematic representation of an apertured substrate in the form of a mesh 42 for use in the method. The mesh 42 includes apertures 44. The mesh 42 is dipped into liquid polymer and cured to form a sheet 46 of cured polymer comprising profile elements in the form of recesses 48. The polymer stretches across the apertures 44 between the strands of the mesh 42. As it cures, the polymer is pulled into a concave shape within the apertures 44 to form recesses 48 as shown schematically in FIG. 27B. The sheet 46 forms the base layer, onto which the reflector is deposited to provide the optical coating structure.

Figure 28:
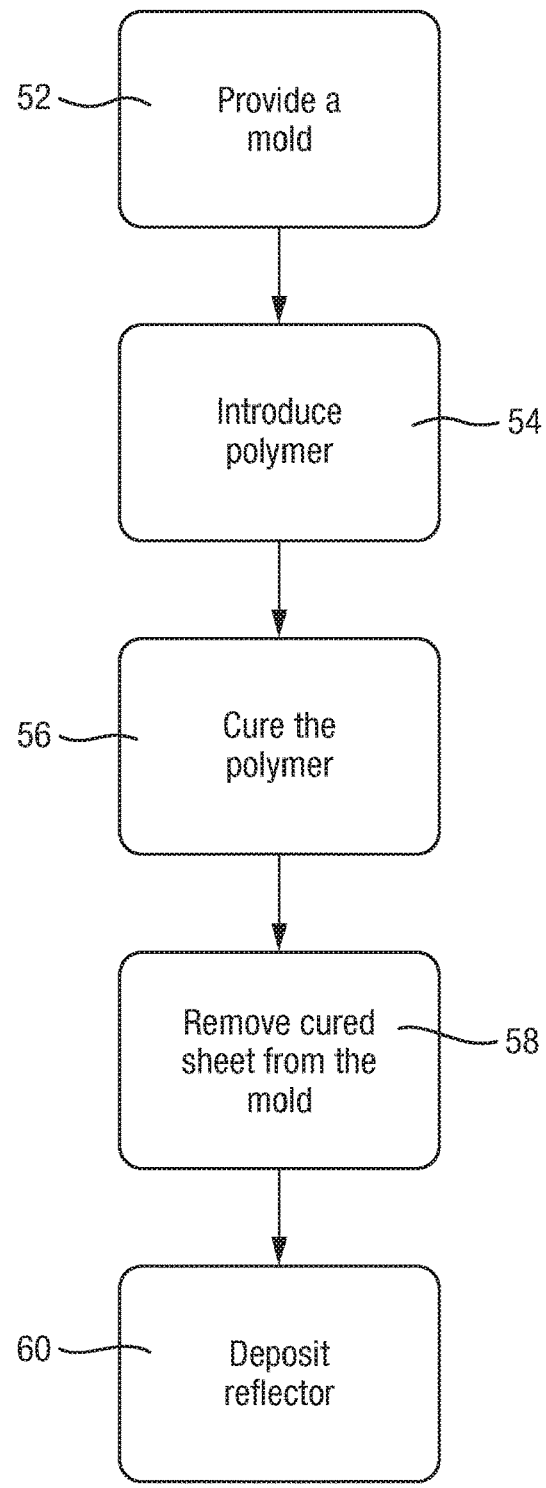
FIG. 28 is a flowchart illustrating steps for an alternative way of providing a base layer of the optical coating structure

FIG. 28 is a flowchart illustrating steps for an alternative way of providing a base layer of the optical coating structure. In this sequence, a mold is provided in step 52. Polymer is introduced into the mold in step 54. The polymer may be poured into the mold, or it may be introduced as a powder which is melted in the mold. The mold is patterned with an inverse of the intended profile elements. The polymer is cured in step 56 to produce a sheet of cured polymer comprising profile elements on a surface. The cured may be peeled from the mold to remove it from the mold in step 58. This provides the base layer of the optical coating structure. A reflector may then be deposited on the base layer in step 60 on the surface comprising the profile elements.

Test Results

Figure 9A:
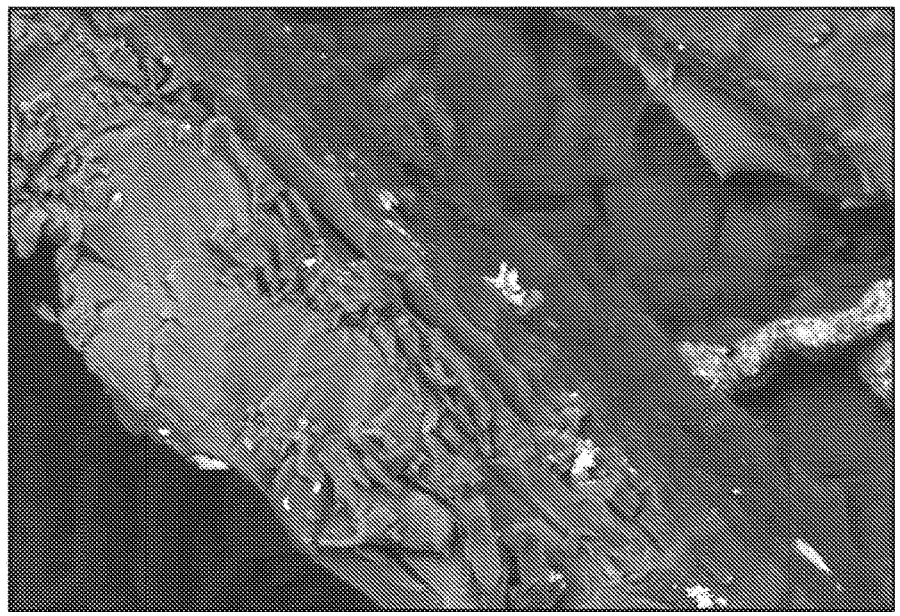
FIGS. 9A and 9B shows scanning electron micrographs illustrating a cross-section of an indentation-type base structure, as formed in a (approximately 20 µm thick) lacquer applied to the surface (FIG. 9B is a higher magnification of the central part of FIG. 9A)
Figure 9B:
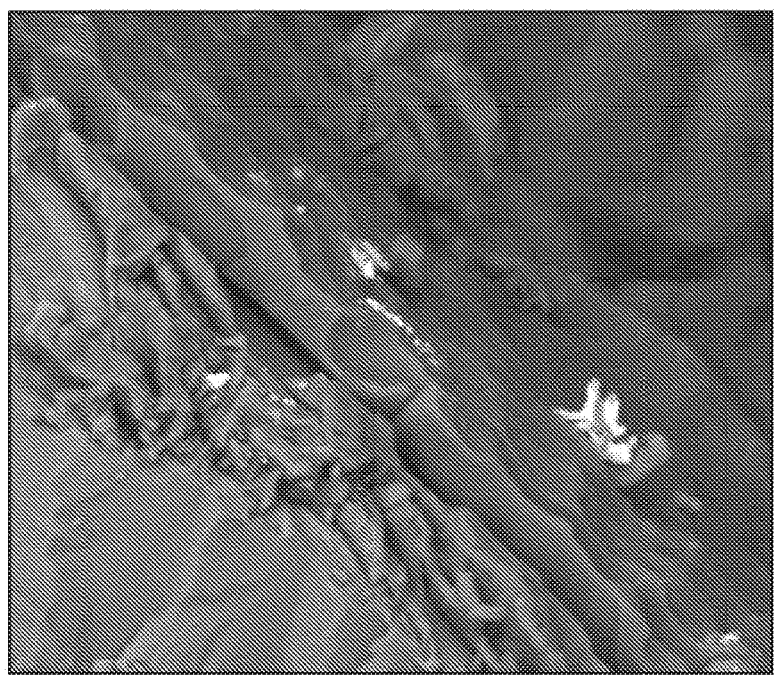

FIGS. 9A and 9B shows scanning electron micrographs illustrating a cross-section of an indentation-type base structure, as formed in a (approximately 20 μm thick) lacquer applied to the surface. FIG. 9B is a higher magnification of the central part of FIG. 9A (FIG. 9A is at a magnification of approximately ×595). In FIG. 9A, the black triangular shape (bottom left corner) is the scanning electron microscope stub (not part of the sample). The sample is grey in the image. It comprises a piece of plastic sheet, in this case PMMA (acrylic), but could also be PVC or other suitable plastics. In the image, it is about 100 μm thick. On top of this is provided a layer of lacquer which is about 20 μm thick and contains the concave hollows. The boundary between the PMMA and lacquer forms the diagonal line visible in FIGS. 9A and 9B. In the centre of FIG. 9B there is an overly deep hollow (a defect) that almost reaches the depth of the lacquer.

Figure 10A:
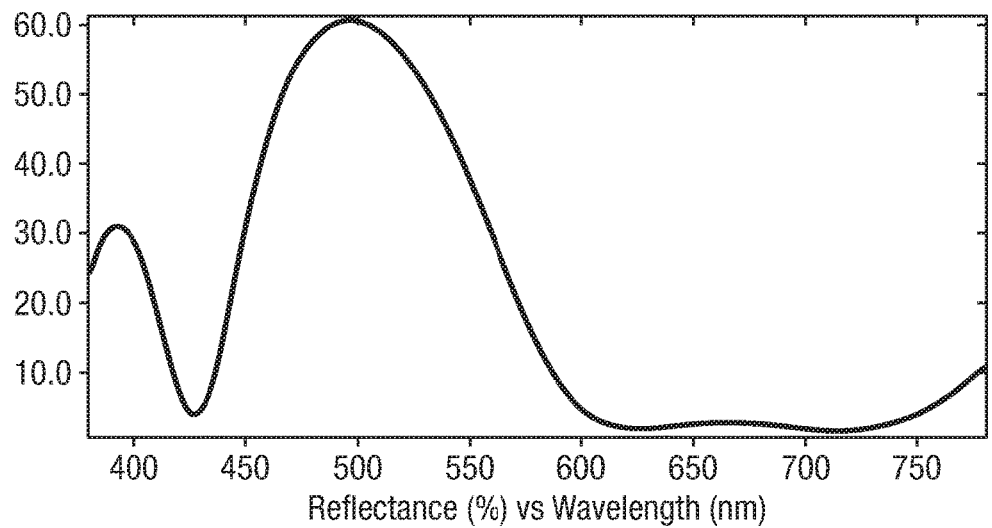
FIGS. 10A and 10B illustrate theoretical reflection profiles of a three layer stack (FIG. 10A) and a seven layer stack involving $SiO_2$ and $ZrO_2$ where $ZrO_2$ forms the innermost and outermost layers (FIG. 10B)
Figure 10B:
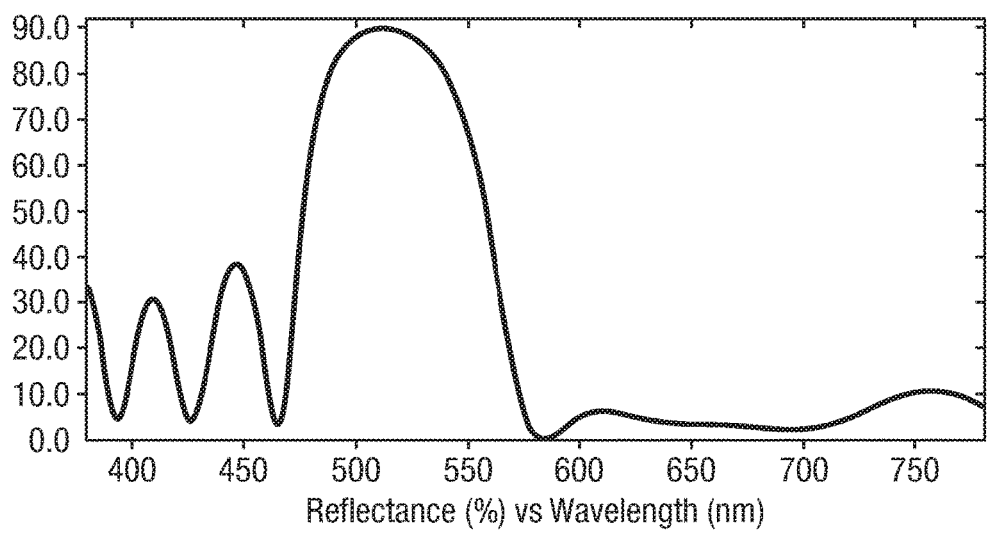

FIGS. 10A and 10B illustrate theoretical reflection profiles for a three layer stack and a seven layer stack respectively. The layer materials are $SiO_2$ and $ZrO_2$ and $ZrO_2$ forms the innermost and outermost layers. As indicated above, due to the effect of the profile elements on the wavelength of reflection (e.g., the sloping sides of the base structures cause reflection of a shorter wavelength), the peak wavelength of reflection is usually shorter than that expected for a flat quarter wave stack. For example, a stack optimised at a peak reflection of 732 nm (i.e. infra-red) can provide an orange hue when coated on the profile elements. Accordingly a step in the manufacture of the optical effect structures may include adjusting the thicknesses of the layers to compensate for the shift in the peak reflection to shorter wavelengths in order to produce a reflection at the desired wavelength from the optical effect structure.

FIG. 11 shows measured transmission curves at normal incidence and at 10° from the normal respectively for a sample optical coating structure having an "electric blue" color.

Figure 12A:
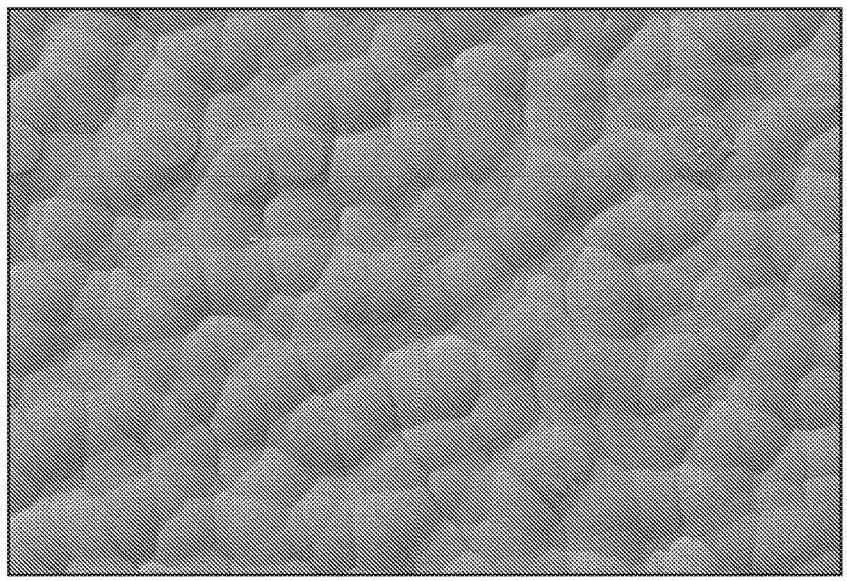
FIGS. 12A and 12B illustrate scanning electron micrographs (same magnification) from different batches of production.
Figure 12B:
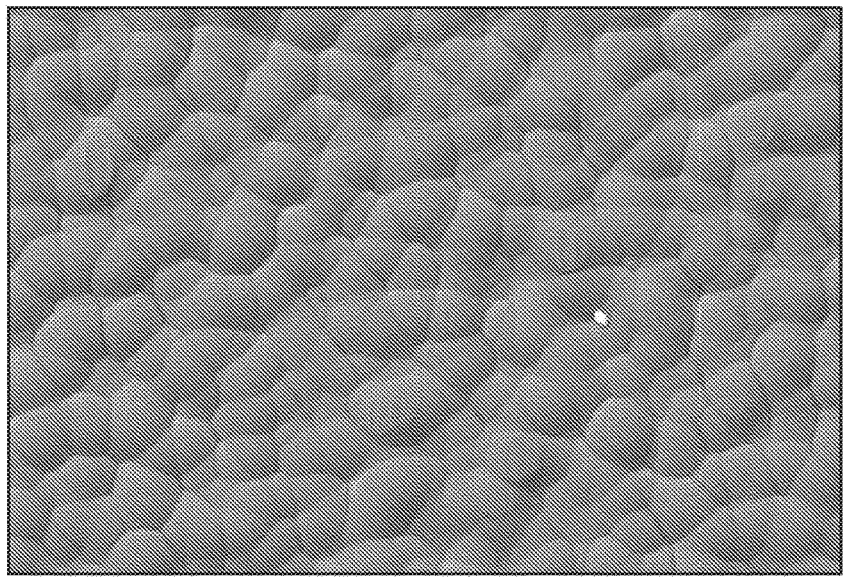
Figure 13A:
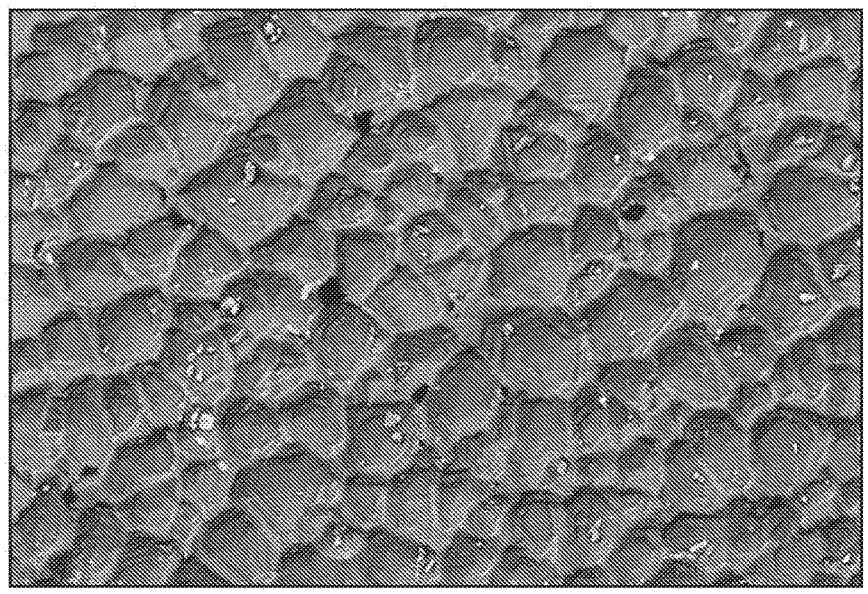
FIGS. 13A and 13B illustrate scanning electron micrographs of two indentation type base structures coated with three layers (blue) in a sputter coating machine.
Figure 13B:
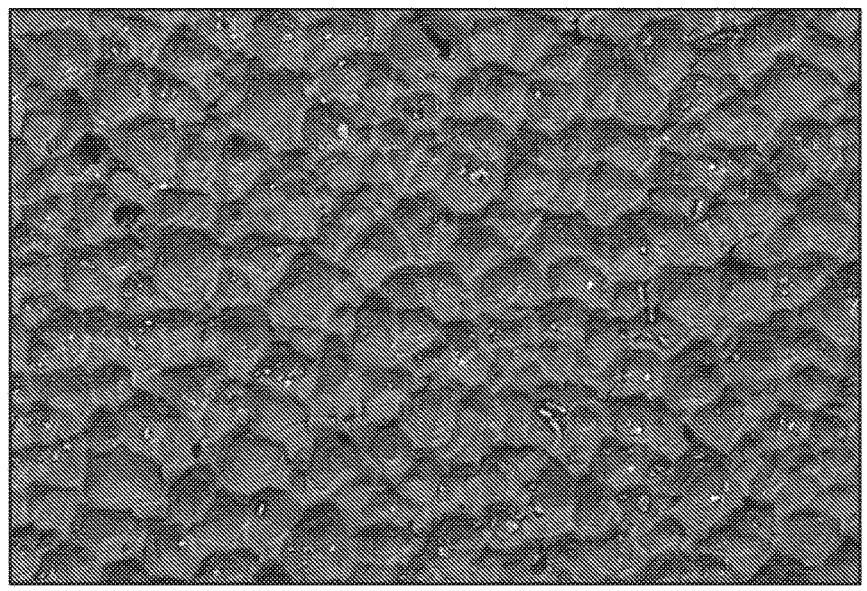

FIGS. 12A and 12B illustrate scanning electron micrographs of two indentation type base structures coated with three layers in a sputter coating machine to produce a blue color effect. The base layers of the optical coating structures were formed using different equipment by different operators. The base layers were then coated in the same machine to determine whether variance in manufacturing processes might adversely affect the optical coating structures.

For the indentation-type base layer structures, while there was a wide variation in size and shape of the profile elements, no significant differences were observed in the optical effect generated, indicating that for these optical coating structures there can be considerable allowable variation in manufacturing. The samples appeared indistinguishable in color and matt effect by the unaided eye, although the degree of sparkle can vary. On closer inspection in a scanning electron microscope, there was evidence of damage during handling as illustrated by the few black regions in the micrographs. However, no difference to the overall colored appearance of the optical coating structure was observed.

Multilayer coatings are standard for the optics industry. They are often used in high-tech applications, e.g. for spectrally tuning lasers, where high accuracy is necessary. As the optical coating structures are intended to be viewed by eye for their color effect (far lower fidelity) rather than a machine reader, manufacturing variance is unlikely to produce any perceived differences in color. The complete manufactured optical coating structures also were found to match the theory extremely well, in terms of the measured wavelength and the color observed at the normal to the samples.

Commercial coating machines are known to reproduce coatings perfectly if the machine parameters are set the same. This was tested on base layers produced in acrylic for coatings at 430 nm. Samples produced in different coating runs appeared identical to the unaided eye. Also, different batches of coating materials are known not to affect the color, because the coating materials are accurately manufactured.

Thus, repeatability can be achieved through following the same design and calibrating accordingly to ensure the same results. Once set up, the coating machine is known to run repeatedly to process all the runs needed to complete a batch.

Table 1 below lists the results of visual assessments on a number of optical coating structure samples.

The sample tested produced an "electric blue" (430 nm) color effect when viewed by eye (see FIG. 11). The optical coating structure comprised 7 layers in total of $SiO_2$ and $TiO_2$. The measurements in the table are given to the nearest 5 degrees.

TABLE 1

Observed colour effect in an "electric blue" optical coating structure sample.
Observed Colour Effect

| Type of Light | Viewing angle | Color observed | Appearance |
|---|---|---|---|
| Diffuse Light (white room lit with bright sunlight, equally scattered) | 0-45 degrees: | vibrant, electric blue | structural colour effect |
| | 45-75 degrees | flat, deep blue | pigment effect |
| | 75-90 degrees | flat, deep violet | pigment effect |
| Directional light (bright, summer sunlight at 5 pm, with sun at 45 degrees in sky): Viewing in transverse plane to that of the sunlight | 0-45 degrees | vibrant, electric blue | structural color effect |
| | 45-75 degrees | flat, deep blue | pigment effect |
| | 75-90 degrees | flat, deep violet | pigment effect |
| Directional light (bright, summer sunlight at 5 pm, with sun at 45 degrees in sky): Viewing in plane of the sunlight, in mirror reflection | 0-45 degrees | vibrant, electric blue | structural colour effect |
| | 45-75 degrees | flat, deep blue | pigment effect |
| | 75-90 degrees | flat, deep violet | pigment effect |
| Directional light (bright, summer sunlight at 5 pm, with sun at 45 degrees in sky): Viewing in plane of the sunlight, in retro-reflection | 0-20 degrees | vibrant, electric blue | structural colour effect |
| | 20-60 degrees | flat, deep blue | pigment effect |
| | 60-90 degrees | flat, deep violet | pigment effect |

While Table 1 shows the results of viewing one optical coating structure sample where the sample was flat, it should be borne in mind that the size and shape of the object colored by the optical coating structure may also affect the psychological interpretation of the color. Additionally, each hue may vary considerably. It is thought that blues appear in the mind of the observer to change color less than other parts of the spectrum, since a mid-blue changing to dark blue then violet will not appear as dramatic as a yellow changing to green, for example.

Table 2 below lists a number of peak wavelengths and colors that have been achieved for the described optical coating structures.

TABLE 2 peak wavelengths and observed colours in optical coating structure samples.

| Peak wavelength/nm | Colour |
|---|---|
| 380 | Violet |
| 400 | Violet - deep blue |
| 436 | Deep blue |
| 440 | Deep blue |
| 462 | Light blue |
| 490 | Very light blue |
| 512 | Bluish/turquoise |
| 614 | Greenish gold/yellow |
| 670 | Light orange |
| 710 | Orange |
| 753 | Deep orange |
| 802 | Light orange |
|  | Crimson |

Three samples were photographed under different lighting conditions. It is evident that the degree of variation in hue with lighting condition and viewing angle is dependent on the sample selected—some colors (e.g. a silver-blue sample) vary more than others (e.g. a mid-blue sample). The strongest color change is observed on a sunny day while viewing the mirror-reflection of the sunlight.

The following samples were photographed:
1. Mid-blue: seven-layer "plasma" coating; quarter-wave stack, centred at 430 nm.
2. Silver-blue: seven-layer "plasma" coating; quarter-wave stack.
3. Silver: metal+dielectric vacuum coating.

These three examples were chosen since they provide a range of the coating types and colors that appear not to change much to the unaided eye (e.g. samples 1 and 3) and that do change most noticeably with angle of viewing/incident light (sample 2).

The photographs did not capture the visual effect—they appear flat, whereas the samples look three-dimensional and mesmeric. Also, the photographs did not capture the precise hues—the mid-blue sample, for example, appeared a much deeper blue in the photographs, whereas to the eye they appeared a mid, "electric" blue (at normal incidence). However, the photographs did capture the change in hue under different light/viewing conditions.

The light conditions chosen represent the (near) extremes of what can be encountered in an average day (excluding specialized room lights). The angle at which the photographs were taken where 0 degrees, 45 degrees and 75 degrees. Where the sun is not directly overhead (as it is at midday), photographs were taken from within two planes: (i) that of the sun's path in the sky, and (ii) that perpendicular to (i). For (i), photographs were taken facing into the sun (i.e. capturing the mirror-reflection) and with the sun behind the camera (i.e. capturing the retro-reflection). In the near-diffuse conditions, the samples were photographed in a room with white walls and ceiling, at midday, under overcast conditions, with sunlight only illuminating the room from a large, open door (only weak shadows were seen in the room, indicating near-diffuse conditions, with minor directional light). All photographs were taken in Sardinia on 28 and 29 Jul. 2015 (i.e. near mid-summer).

The results of the photographs were as follows:
1. Sample 1 (mid-blue) did not change significantly in hue within angles of viewing of at least 75 degrees around the normal (i.e. a 150 degree viewing cone). The only exception to this is when it was viewed in mirror-reflection, in bright sunlight, but this condition is quite restricted.
2. Sample 2 (silver-blue) varied in hue considerably under the different viewing conditions, although not so much in near-diffuse light.
3. Sample 3 (silver) lay somewhere between the effect of Samples 1 and 2, appearing silver in hue with angles of viewing of at least 45 degrees around the normal (i.e. a 90 degree viewing cone), then becoming bluish-silver in appearance.

These results indicate that the preferred optical coating structures appear more consistent in hue with viewing conditions for some colors than others. For some commercial applications, color consistency will be important and therefore favour certain hues of optical coating structures, although a change in hue may be desirable for other applications.

For mid-blue, for example, a bright, mesmeric color can be achieved that changes little with most viewing or light conditions. This can be achieved for other hues, too.

The materials of the thin-film layers, particularly the innermost and outermost layers, will affect the resilience of the optical coating structure to everyday use. Oxide materials such as $SiO_2$, $ZrO_2$ and $TiO_2$, at least, are known to be particularly "tough", resilient materials. In addition, adhesion of the layers to the substrates is greater than that for flat profiles, since the surface topography helps to improve adhesion.

Samples of the optical coating structure were also examined for their resilience to general handling. Scanning electron micrographs of two indentation-type base structures coated with three-layers (blue) in a sputter coating machine were examined. A few black regions were identified as areas that had been damaged during handling. However, no difference to the overall colored appearance of the device was observed.

Samples were also examined to see the effect of fingerprints. Fingerprints cause grease layers on the surface, which appear, under the microscope, as tiny oil patches, creating interference colors. Several fingerprints can leave around 1% coverage in such "oil". It was found that these can be cleaned off with acetone, for example, without harming the optical coating structure.

Scratch tests and a tape adhesion test, known as "mil spec tests" were conducted on the same three-layer coated samples (indentation-type base structures) as follows. Note that these samples were made by ordinary sputter coating (not plasma coating), i.e. at high temperature; considerable outgassing from the acrylic substrate would have occurred at the high temperatures used, which probably led to relatively poor adhesion of the films to the substrate (i.e. plasma coated samples would have performed better in the scratch test).

The tests comprised a mild abrasion test, a severe abrasion test and a tape adhesion test. The mild abrasion test was performed involving 50 "rubs" of a cheesecloth abrader on the optical coating structure sample. The samples passed this test. The severe abrasion test involved 20 "rubs" of a rubber abrader impregnated with grit. Damage to the reflector was observed at this high level of abrasion. The tape adhesion test involved pressing adhesive tape against the optical coating structure and ripping it off the surface. No removal of any part of the reflector was observed meaning that the optical coating structure passed this test. Additional coatings of up to 9 layers, made using a plasma coating system, also passed the adhesion ("tape") test.

Figure 14A:
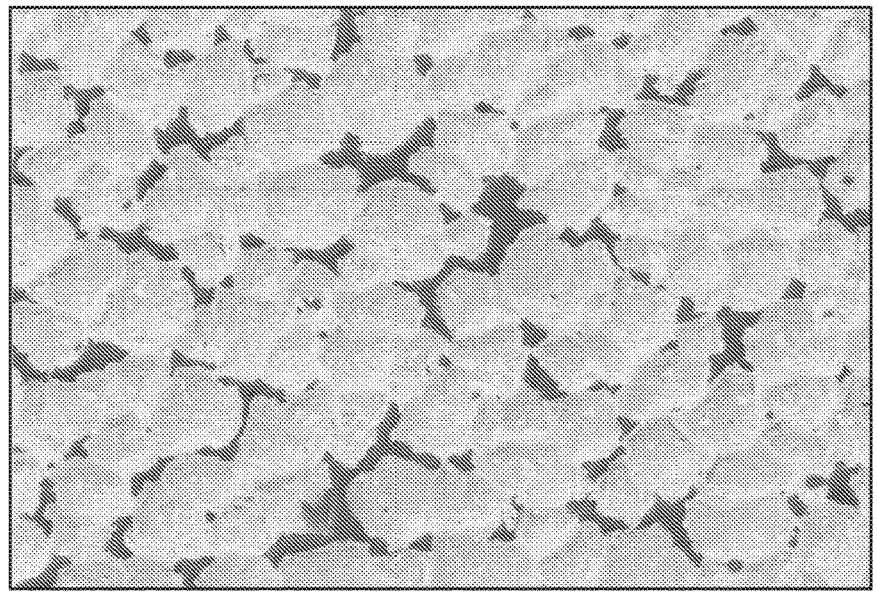
FIGS. 14A and 14B illustrate a scanning electron micrographs showing damage to a coating during an abrasion test of a sample optical coating structure.
Figure 14B:
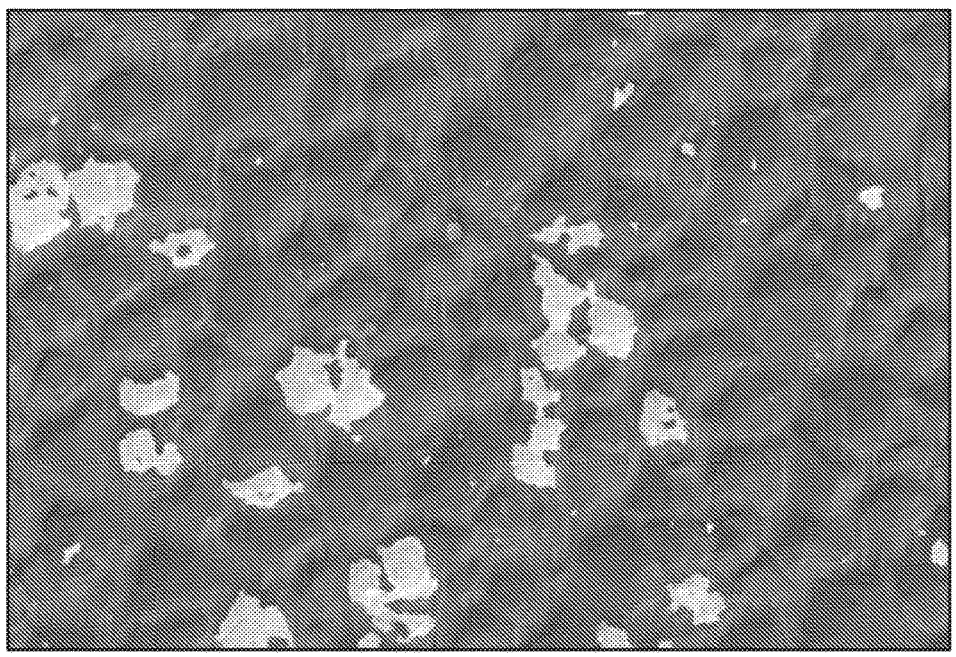

FIGS. 14A and 14B illustrate scanning electron micrographs showing damage to a reflector coating of sample optical coating structures during the mild and severe abrasion tests respectively. Both images are taken of a central region of the particular sample where the abrasion was most intense. In the micrographs, the reflector appears white and the base layer appears dark grey where the coating has been rubbed off. The tests established that the optical coating structure samples could still provide good color effects despite small amounts of damage being observed during the mild abrasion tests. When much more substantial abrasion was applied it was found that only small amounts of reflector remained left on the base layer and these were insufficient to provide a desired color effect. This may be a consequence of the material of the substrate, which affects the level of attachment of the thin-film layers.

To help provide abrasion resistance for the optical coating structure, a protective, transparent coating can be applied to the reflector. Parylene, for example, adheres extremely well to the oxide layers of a quarter wave stack and can provide a good level of protection. It generally does not affect the perceived color (hue) of the optical coating structure, but it does alter the matt effect. At thicker levels, the outermost surface of the Parylene coating begins to flatten out, imparting mirror-like reflections of white light (it becomes shiny). This may or may not be desirable. Such coatings may also provide resilience to fingerprints and smear marks.

In practice, the material of the substrate (which might be of, for example, acrylic or other plastics) may be softer than the materials that the optical coating structure is likely to encounter during daily use (for example, keys or coins), and deformation of the profile elements may result in some loss of the reflective properties of the structure. While the oxide layers of the reflector can provide some scratch resistance, in some cases it may be desirable to apply an additional harder surface layer to try to minimise further any scratch damage.

Optical coating structure samples, made using reflectors consisting of seven layers of $TiO_2$ and $SiO_2$ and also metal plus dielectric (two) layers, applied onto 3 mm thick acrylic base layers provided with profile elements, were heated on a hot plate to 70 degrees Centigrade. No color change was observed, indicating that these optical coating structures can be used on a variety of day-to-day objects to provide permanent color without degradation during normal use.

Figure 15:
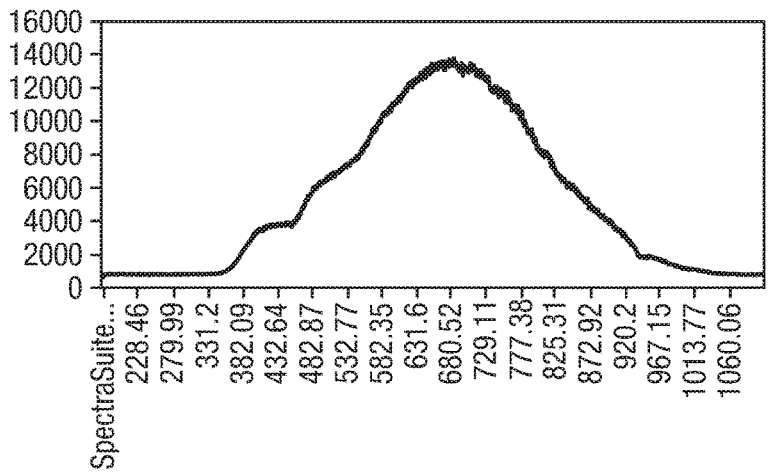
FIG. 15 shows the emission spectrum of a white lamp used in the reflectivity measurements of FIGS. 16A to 20B.

FIG. 15 shows the emission spectrum of a (white) lamp used in the reflectivity measurements of FIGS. 16A to 20B. The x-axis shows wavelength in nm while the y-axis shows reflectivity in arbitrary units. A spectrometer using the lamp was used to take peak wavelength and reflectance measurements under white, directional light at different angles of incidence/reflection (the mirror-reflection angle was measured). The measured spectra were normalized against the emission spectrum of the lamp.

Figure 16A:
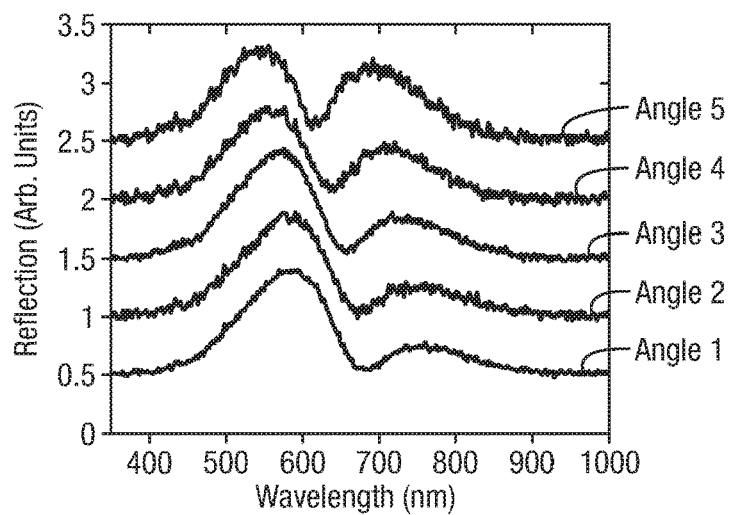
FIG. 16A shows a series of reflection spectrums received from a blue optical effect structure having indentation-type profile elements.
Figure 16B:
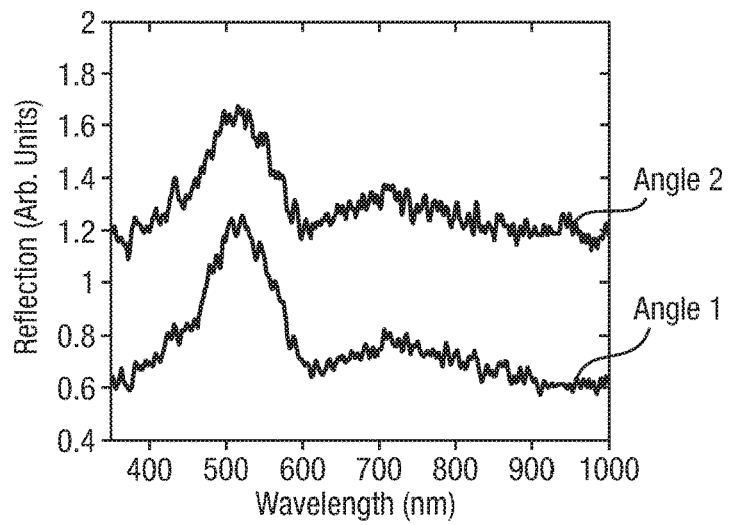
FIG. 16B shows reflection spectrums received from a blue glass optical effect structure having indentation-type profile elements.

FIG. 16A shows a series of five reflection spectrums received from a blue optical coating structure having indentation-type profile elements, each from a different angle of reflection; angle 1 is 12°, angle 2 is 20°, angle 3 is 22.5°, angle 4 is 29° and angle 5 is 35°. FIG. 16B shows two reflection spectrums received from a blue glass optical coating structure having indentation-type profile elements; where angle 1 is 11°, angle 2 is 21°.

Figure 17A:
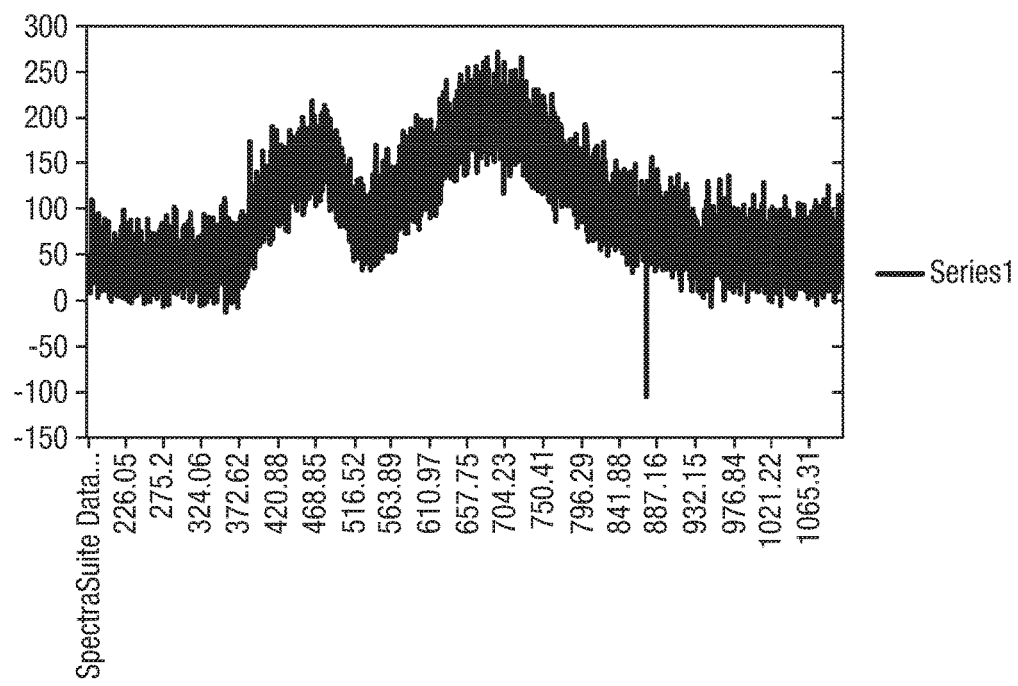
FIGS. 17A and 17B show reflection spectrums from a blue optical effect structure (having indentation-type profile elements) at 45° and at near-normal respectively.
Figure 17B:
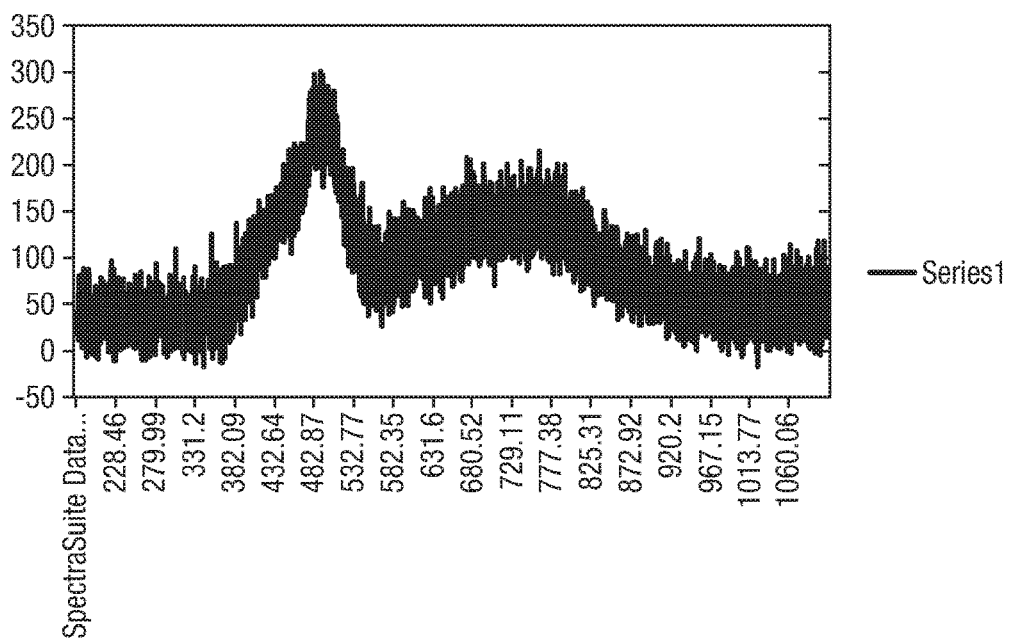
Figure 18A:
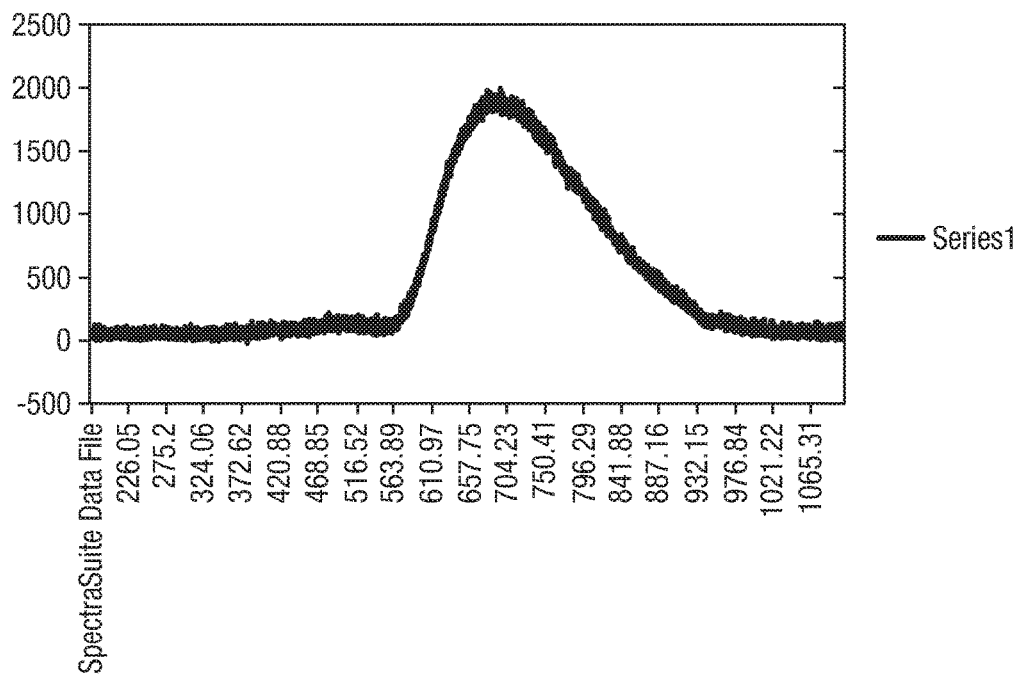
FIGS. 18A and 18B show reflection spectrums from a crimson optical effect structure (having indentation-type profile elements) at 45° and at near-normal respectively.
Figure 18B:
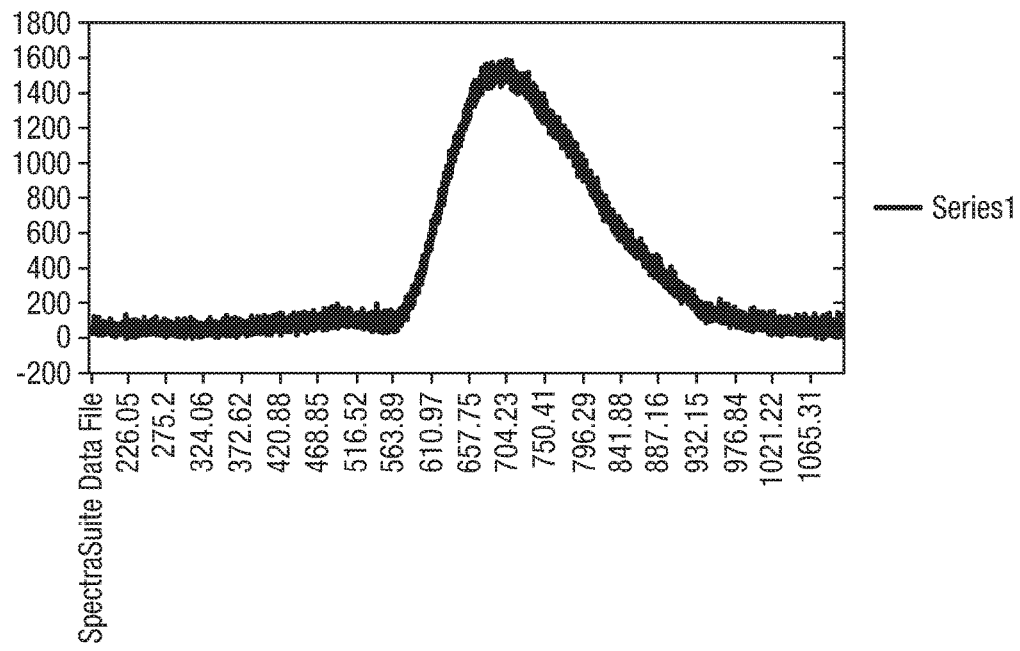
Figure 19A:
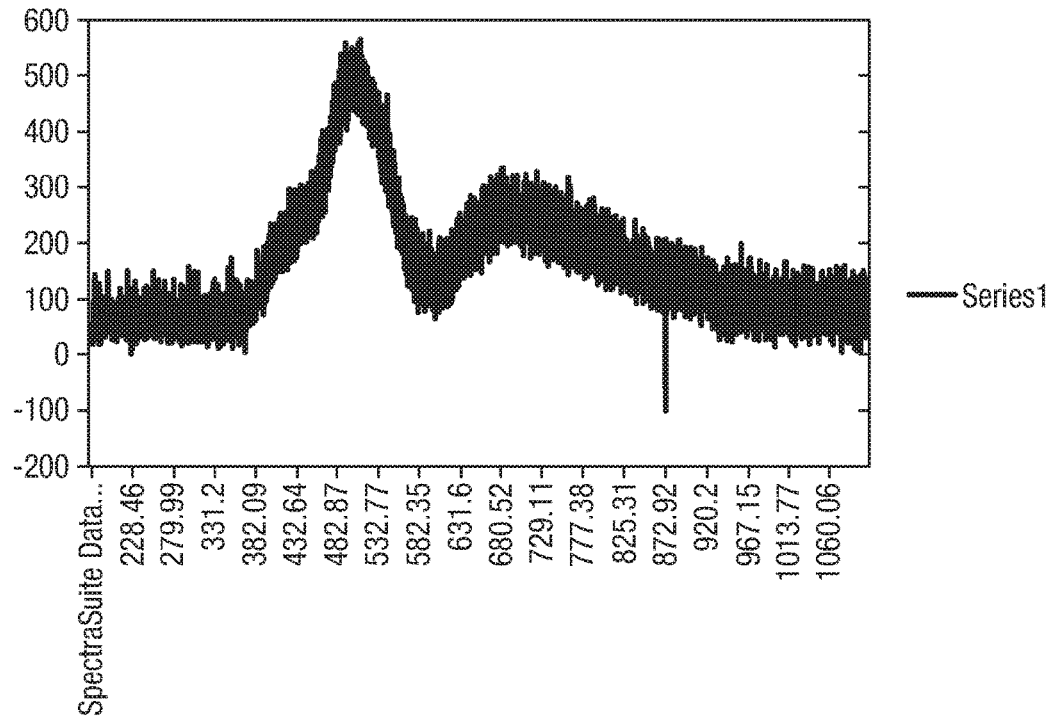
FIGS. 19A and 19B show reflection spectrums from a glass optical effect structure (having indentation-type profile elements) at 45° and at near-normal respectively.
Figure 19B:
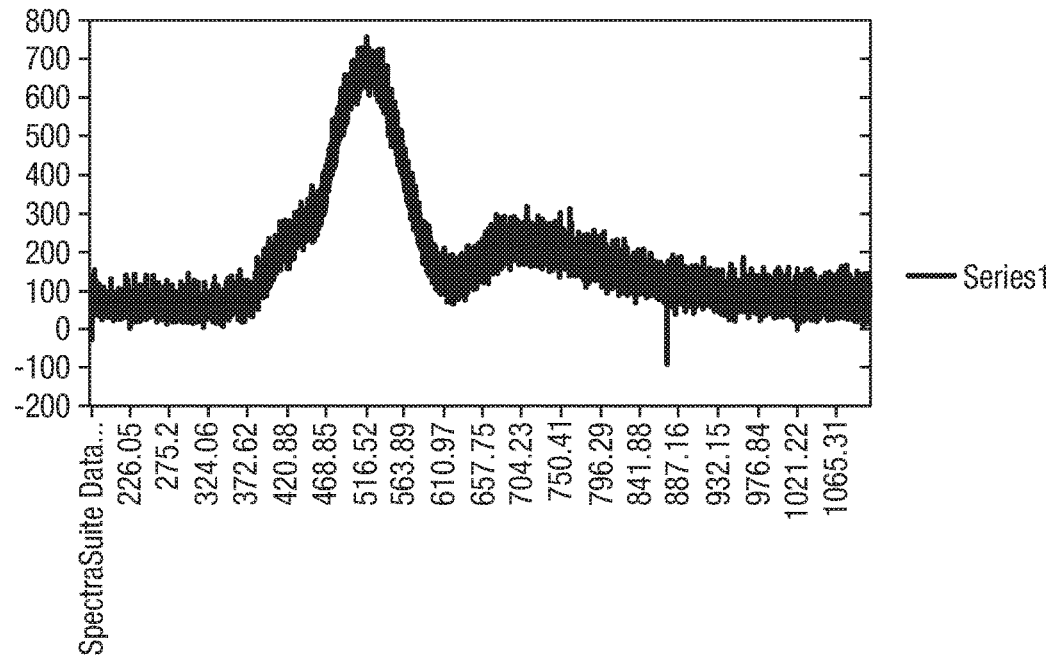
Figure 20A:
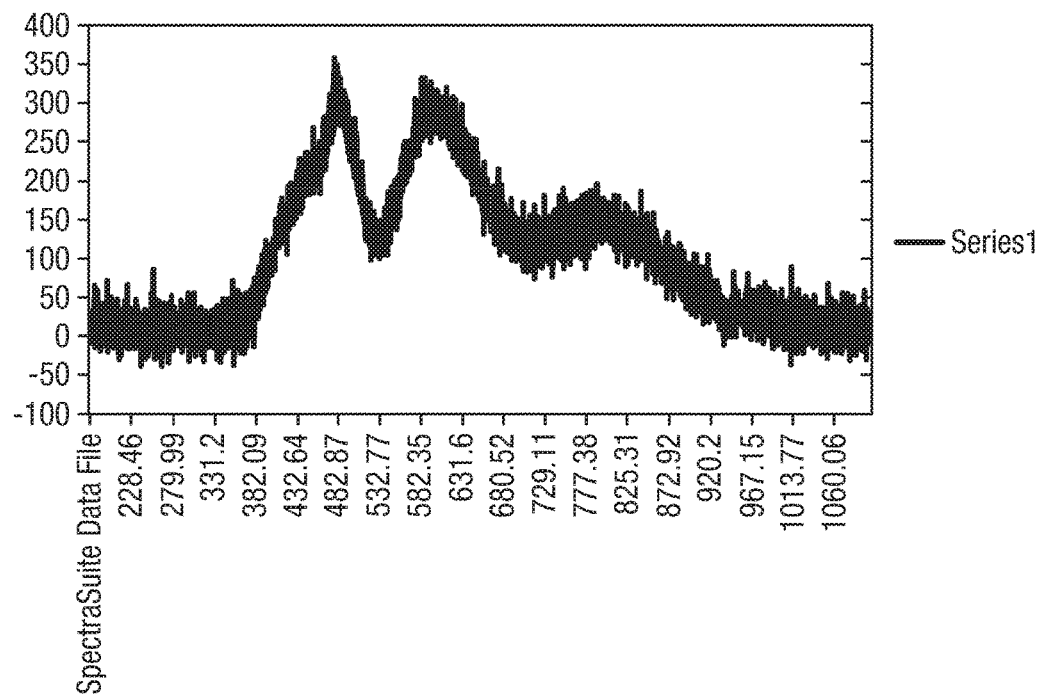
FIGS. 20A and 20B show reflection spectrums from a blue optical effect structure (having projection-type profile elements) at 45° and at near-normal respectively.
Figure 20B:
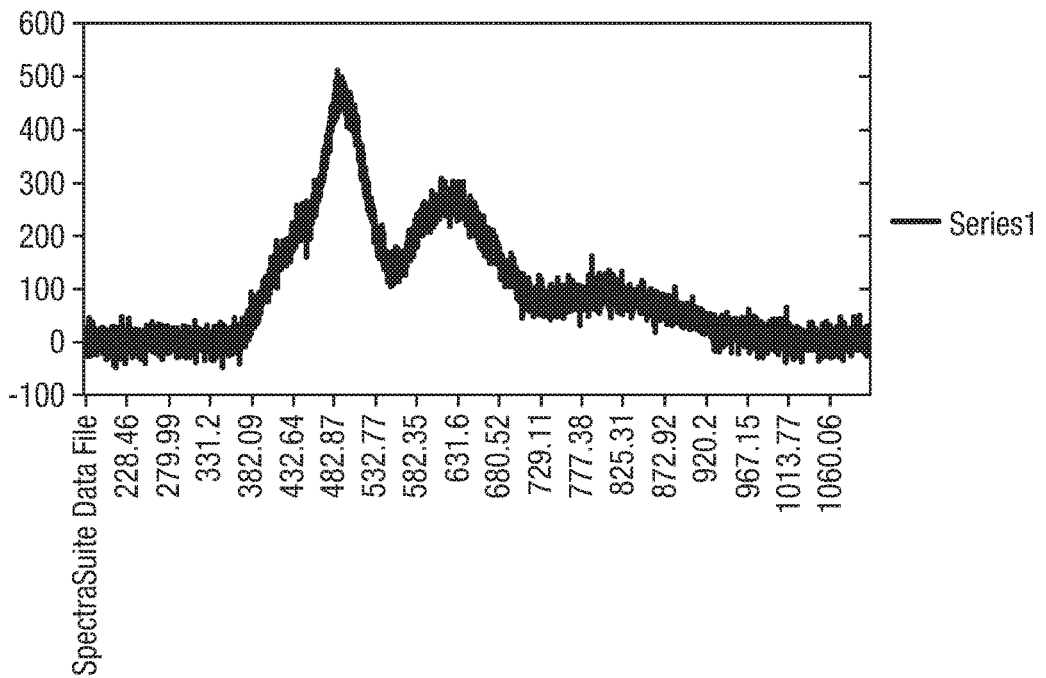

FIGS. 17A through to 20B show reflection spectrums received from a number of different optical coating structures when illuminated with the white lamp in the spectrometer. FIGS. 17A and 17B show the reflection spectrums for a blue optical coating structure having indentation-type profile elements at 45° and at near-normal respectively. FIGS. 18A and 18B show reflection spectrums from a crimson optical coating structure having indentation-type profile elements at 45° and at near-normal respectively. FIGS. 19A and 19B show reflection spectrums from a glass optical coating structure having indentation-type profile elements at 45° and at near-normal respectively. FIGS. 20A and 20B show reflection spectrums from a blue optical coating structure having projection-type profile elements at 45° and at near-normal respectively. In all cases, the units for reflection are arbitrary since the amplitude would depend on many factors such as the brightness of the lamp and the distance away from the sample.

For all the tested samples, the reflection spectrums illustrate how the different angles of incidence and reflection can change the wavelength of the reflection, shifting the reflection to shorter wavelengths as the angle of incidence/reflection becomes steeper. Despite this change, however, when the samples were observed with the naked eye, due to global averaging of the eye, the observer tends to see a strong, bright reflection of a single color from a wide range of directions—the samples appearing intense but not shiny, providing a mesmerizingly deep, luxuriously matt effect.

The invention claimed is:

1. An optical coating structure that when applied to a surface of an object imparts a structural color to the object wherein the color remains substantially the same to an observer over a broad range of viewing angles, the optical coating structure comprising:
    a base layer;
    a multilayer reflector on the base layer to impart the color; and
    profile elements on the base layer under the reflector wherein the reflector conforms to the surface profile of the profile elements, the profile elements having a width and length which are each in the range of 5 to 500 μm in size, and being arranged in non-periodic manner such that the profile elements are configured to avoid diffraction effects, wherein the profile elements are shaped so that greater than 50% of the surface area of the reflector is approximately normal to the incoming light when the light is incident at the normal to the plane of the surface and shaped so that greater than 30% of the surface area of the reflector is approximately normal to the incoming light when the light is incident at an angle of up to 30 degrees, wherein the profile elements reduce the multilayer reflector's normal property of color change with changing viewing angle.

2. An optical coating structure according to claim 1, wherein the base layer is a black colored material, or a transparent material to visible light.

3. An optical coating structure according to claim 1, wherein the profile elements have a height which is in the range of 0.1 to 50 μm.

4. An optical coating structure according to claim 1, wherein the profile elements are an array of overlapping bumps, or are a non-periodic array of indentations.

5. An optical coating structure according to claim 1, wherein the multilayer reflector comprises layers of higher and lower refractive index materials,
    wherein the multilayer reflector consists of less than 20 layers,
    wherein the multilayer reflector is configured to produce a reflection having a peak wavelength in the range of 350 to 800 nm, and
    wherein there is no break in the continuity of the layers of the reflector.

6. An optical coating structure according to claim 1, wherein the width and/or length of at least 50% of the profile elements is 10 to 100 times the thickness of the reflector;
   wherein the average period between adjacent profile structures is between 5 and 100 µm, and
   wherein at least 60% by area of the profile elements have a width and length which are each in the range of 5 to 100 µm in size.

7. An optical coating structure according to claim 1, wherein the profile elements have a ratio of height and length dimensions between 1:2 and 1:100.

8. An optical coating structure according to claim 1, wherein the structure comprises a protection layer on the upper surface of the reflector, which is a layer of $SiO_2$, about 1 µm thick, or is a layer of poly(p-xylylene) polymer.

9. An optical coating structure according to claim 1, wherein the structure comprises an additional coating on the upper surface of the multilayer reflector which is configured to shift incident light towards a normal of the multilayer reflector.

10. An optical coating structure according to claim 9, wherein the additional coating comprises a material that has been cured after application, and wherein the additional coating comprises an acrylic material.

11. An optical coating structure according to claim 1, wherein the base layer is an acrylic material.

12. An object comprising the optical coating structure of claim 1, wherein the optical coating structure is incorporated on a surface of the object to impart a structural color to the object, and wherein more than 50% of a surface of the object incorporates the optical coating structure.

13. An object accordingly to claim 12, wherein the object is a housing of a portable electrical device or wherein the object is a sheet of flexible material for use in articles of manufacture.

14. A method of forming an optical coating structure that when applied to a surface of an object imparts a structural color to the object, wherein the color remains substantially the same to an observer over a broad range of viewing angles, the method comprising:

providing a base layer, the base layer having profile elements thereon, the profile elements having a width and length which are each in the range of 5 to 500 µm in size, and being arranged in a non-periodic manner such that the profile elements are configured to avoid diffraction effects, wherein the profile elements are shaped so that greater than 50% of the surface area of the reflector is approximately normal to the incoming light when the light is incident at the normal to the plane of the surface and shaped so that greater than 30% of the surface area of the reflector is approximately normal to the incoming light when the light is incident at an angle of up to 30 degrees; and depositing a multilayer reflector on the base layer to impart the color, wherein the reflector conforms to the surface profile of the profile elements and wherein the profile elements reduce the multilayer reflector's normal property of color change with changing viewing angle.

15. A method as claimed in claim 14, wherein an acid-etching process is used to form a mold for forming the profile elements.

16. A method as claimed in claim 14, wherein plasma coating process is used to deposit multiple layers to form the reflector, and
   wherein the plasma coating process deposits between 2 and 8 layers of alternating dielectric materials.

17. A method as claimed in claim 14, including a step of depositing a protection layer on to a surface of the reflector.

18. A method as claimed in claim 14, including a step of depositing an additional coating on to a surface of the multilayer reflector, the material of the additional coating being selected to shift incident light towards a normal of the multilayer reflector.

19. A method as claimed in claim 14, wherein the method includes the step of bending the base layer with profile elements already formed thereon.

* * * * *